United States Patent [19]
Sato

[11] Patent Number: 5,831,773
[45] Date of Patent: Nov. 3, 1998

[54] ZOOM LENS

[75] Inventor: Haruo Sato, Kawaguchi, Japan

[73] Assignee: Nikon Corporation, Tokyo, Japan

[21] Appl. No.: 753,476

[22] Filed: Nov. 26, 1996

[30]     Foreign Application Priority Data

Dec. 19, 1995  [JP]  Japan ..................................... 7-348829
Dec. 19, 1995  [JP]  Japan ..................................... 7-348830

[51] Int. Cl.$^6$ ............................. G02B 15/14; G02B 3/02; G02B 9/62
[52] U.S. Cl. ......................... 359/691; 359/689; 359/681; 359/682; 359/717; 359/762
[58] Field of Search .................. 359/691, 681, 359/682, 717, 762, 689

[56]                References Cited

U.S. PATENT DOCUMENTS 4,099,846  7/1978  Kawamura et al. ..................... 359/681
4,775,228  10/1988  Ikemori et al. ......................... 359/691

FOREIGN PATENT DOCUMENTS 52-32342   3/1977   Japan .
61-91613   5/1986   Japan .
2-201310   8/1990   Japan .
 4-15612   1/1992   Japan .
 4-275515  10/1992  Japan .

OTHER PUBLICATIONS

"Handbook of Optics: vol. I," Michael Bass (Editor in Chief), McGraw–Hill, Inc., New York, NY, pp. 1.38, 1995.

Primary Examiner—Georgia Y. Epps
Assistant Examiner—Evelyn A. Lester
Attorney, Agent, or Firm—Oliff & Berridge, PLC

[57]                ABSTRACT

A zoom lens system of compact size having a small number of lenses and a large field area is provided, comprising, in the following order from the object side, a first lens group G1 with a negative refractive power and a second lens group G2 with a positive refractive power, wherein zooming is executed by changing dead space between lens groups G1 and G2. The first lens group G1 comprises, in the following order from the object side, a first lens group front group $G_{1F}$ with a negative refractive power, and a first lens group rear group $G_{1R}$ with either a negative refractive power or a positive refractive power having at least one set of color erasable negative lens components $L_n$ and positive lens components $L_p$. Focusing is executed by moving only front group $G_{1F}$. For increased field angle, the first lens group G1 comprises a first subgroup L11 having a negative refractive power formed in a meniscus shape with a concave surface facing the image side, a second subgroup L12 with a negative refractive power having a cemented negative lens assembly with a negative lens and a positive lens cemented, and a third subgroup L13 having a positive refractive power with a convex side facing the object side.

26 Claims, 35 Drawing Sheets

ZOOM LENS

BACKGROUND OF THE INVENTION

1. Field of the Invention

The present invention relates to a zoom lens, in particular, a wide angle or super wide angle zoom lens comprising a front-back division focusing system that is compact and excels in terms of cost performance.

2. Description of Related Art

In the past, most focusing system of negative preceding type wide angle and super wide angle zoom lenses have generally been of the negative front group play method. However, as the field angle of lenses as well as diameters of the lenses became larger, it became apparent that astigmatism at the maximum wide-angle state, the fluctuation of lower coma during focusing, spherical aberration at the maximum telephoto state, and fluctuation of coma during focusing cannot be corrected only by the simple front group play method. Moreover, a large increase in the field angle often resulted in a decline of the amount of light in the marginal zone during focusing.

In order to overcome these problems, various suggestions have been made. For example, with a zoom lens disclosed in Japanese Laid-Open Patent Publication 52-32342, astigmatism at the maximum wide-angle state and fluctuation of lower coma are improved by using the front group play method for the front group with a negative-positive 2-group structure, and in addition, by changing the dead space in the front group.

Moreover, in a zoom lens disclosed in Japanese Laid-Open Patent Publication 4-15612, a focusing system is proposed wherein the negative front group with a negative-positive 2-group structure is divided into two negative lens groups and focusing is executed by the rear negative group.

Moreover, in a zoom lens disclosed in Japanese Laid-Open Patent Publication 2-201310, a focusing system is proposed wherein the negative first group of the zoom lens with a negative-positive-negative-positive 4-group structure is divided into a front group and a rear group and focusing is executed only by the rear group.

Furthermore, in a zoom lens disclosed in Japanese Laid-Open Patent Publication 61-91613, a focusing system is proposed wherein the negative first group of the zoom lens with either a negative-positive-negative 3-group structure or a negative-positive-positive 3-group structure is divided into a front group and a rear group and focusing is executed only by the front group.

However, in the zoom lens disclosed in Japanese Laid-Open Patent Publication 52-32342, because two lens groups move during focusing, the structure of the lens barrel becomes undesirably complicated. Moreover, though the lens contributes to the improvement of fluctuation of astigmatism and coma during focusing, the lens does not result in much improvement in the decline of the amount of light in the marginal zone.

Moreover, in the zoom lens disclosed in Japanese Laid-Open Patent Publication 4-15612, the dead space needed during focusing must be provided between two negative lens groups which are divided. Hence, particularly in the case of super wide angle zoom lens, an increase in diameter of the frontmost lens and decline in the amount of light in the marginal zone will result. Furthermore, the lens does not result in much improvement in aberration fluctuation of astigmatism and lower coma during focusing.

Moreover, in the zoom lens disclosed in Japanese Laid-Open Patent Publication 2-201310, though there is a difference between the 2-group structure zoom lens and the 4-group structure zoom lens, basically there is the problem of the system becoming too large due to the securing of dead space needed for focusing, and the problem of aberration fluctuation of astigmatism and lower coma remains as with the zoom lens of Japanese Laid-Open Patent Publication 4-15612, requiring further improvement.

Moreover, in the zoom lens disclosed in Japanese Laid-Open Patent Publication 61-91613, the negative first group is divided into a negative front group and a positive rear group, and focusing is executed only by the front group. However, because the purpose of the zoom lens is to correct the near distance fluctuation of spherical aberration at the maximum telephoto state caused by the enlargement of the diameter of the lens, the refractive power of the positive rear group is extremely small and the rear group is made of one positive lens. Hence, the system is not effective in the correction of astigmatism and lower coma and is not suitable for zoom lenses having a large field angle as with the present invention.

Additionally, in recent years, super wide angle zoom lenses and wide angle lenses have become more compact with higher power magnification capability. Particularly, a zoom lens structure comprising negative-positive 2-group structure, or a 3-group zoom lens comprising basically a negative-positive 2-group zoom structure to which the third lens group with extremely weak refractive power is added in the image side, is suitable for production of an inexpensive wide angle zoom lens and a super wide angle zoom lens. However, there are but a few suggestions made for a super wide angle zoom lens whose field angle at the maximum wide-angle state exceeds 100°.

Examples of such zoom lenses are disclosed in Japanese Laid-Open Patent Publication 4-15612 and Japanese Laid-Open Patent Publication 4-275515, but very few suggestions have been made for a compact super wide angle zoom lens with superior cost performance having a small number of lenses.

The zoom lens of above-mentioned Japanese Laid-Open Patent Publication 4-15612 is a super wide angle zoom lens that covers a field angle at a maximum wide-angle state of 112.7° but due to placement of a positive lens with relatively strong refractive power towards the front of the first lens group, the system is unpractical due to its large size. Moreover, the number of the lenses in the system is large and, in spite of a low zoom ratio of about 1.36 fold, image plane bow, astigmatism and distortion are not corrected sufficiently, nor is imaging performance satisfactory.

Moreover, the zoom lens of Japanese Laid-Open Patent Publication 4-275515 is a zoom lens that covers a field angle at a maximum wide-angle state of 110°, but the zoom lens has a complicated structure of negative-negative-positive 3-group composition with a large number of lenses in the system. Furthermore, similar to the lens of the previous Japanese Laid-Open Patent Publication, a positive lens is placed towards the front, hence the system is unpractical due to its large size. Moreover, because the system adopts a first lens group fixed structure, it is impossible to make the diameter of the front lens extremely small. Furthermore, as far as correction of aberrations is concerned, image surface bow, astigmatism and distortion are not corrected sufficiently, nor is the imaging performance satisfactory, as in the case of the previous Japanese Laid-Open Patent Publication.

SUMMARY OF THE INVENTION

Considering problems mentioned above, the present invention aims to provide a compact zoom lens that has a large field angle exceeding 106°, a high power zooming ratio of about 1.74, a small number of lenses in the system, and is inexpensive to mass produce.

In order to resolve problems described above, the present invention is a zoom lens comprising, in the following order from the object side, a first lens group G1 with a negative refractive power and a second lens group G2 with a positive refractive power, wherein zooming is executed by changing dead space between lens groups G1 and G2. The first lens group G1 comprises, in the following order from the object side, a first subgroup L11 having a negative refractive power formed in a meniscus shape with a concave surface facing the image side, a second subgroup L12 with a negative refractive power having a cemented negative lens assembly with at least a negative lens and a positive lens cemented, and a third subgroup L13 having a positive refractive power with a convex side facing the object side. The second lens group G2 comprises, in the following order from the object side, a first subgroup L21 having a positive refractive power with at least one convex lens, a second subgroup L22 with a negative refractive power having a cemented negative lens assembly with at least a positive lens and a negative lens cemented, and a third subgroup L23 with a positive refractive power having a cemented positive lens assembly with at least a negative lens and a positive lens cemented. At least one of the lens surfaces among all the lens surfaces of the first subgroup L11 and the second subgroup L12 is formed in an aspherical shape.

The zoom lens of the present invention also resolves the problems with the prior art and achieves compact size by comprising, in the following order from the object side, a first lens group G1 with a negative refractive power and a second lens group G2 with a positive refractive power, wherein zooming is executed by changing the dead space between lens groups G1F and G2. The first lens group G1 comprises, in the following order from the object side, a first front subgroup $G_{1F}$ with a negative refractive power, and a second rear subgroup $G_{1R}$ with either a negative refractive power or a positive refractive power having at least one set of color erasable negative lens components $L_n$ and positive lens components $L_p$, wherein focusing is executed by moving only the front subgroup $G_{1F}$.

BRIEF DESCRIPTION OF THE DRAWINGS

The invention will be described in detail with reference to the following drawings in which like numbers refer to like elements and wherein.

DETAILED DESCRIPTION OF PREFERRED EMBODIMENTS

Figure 1:
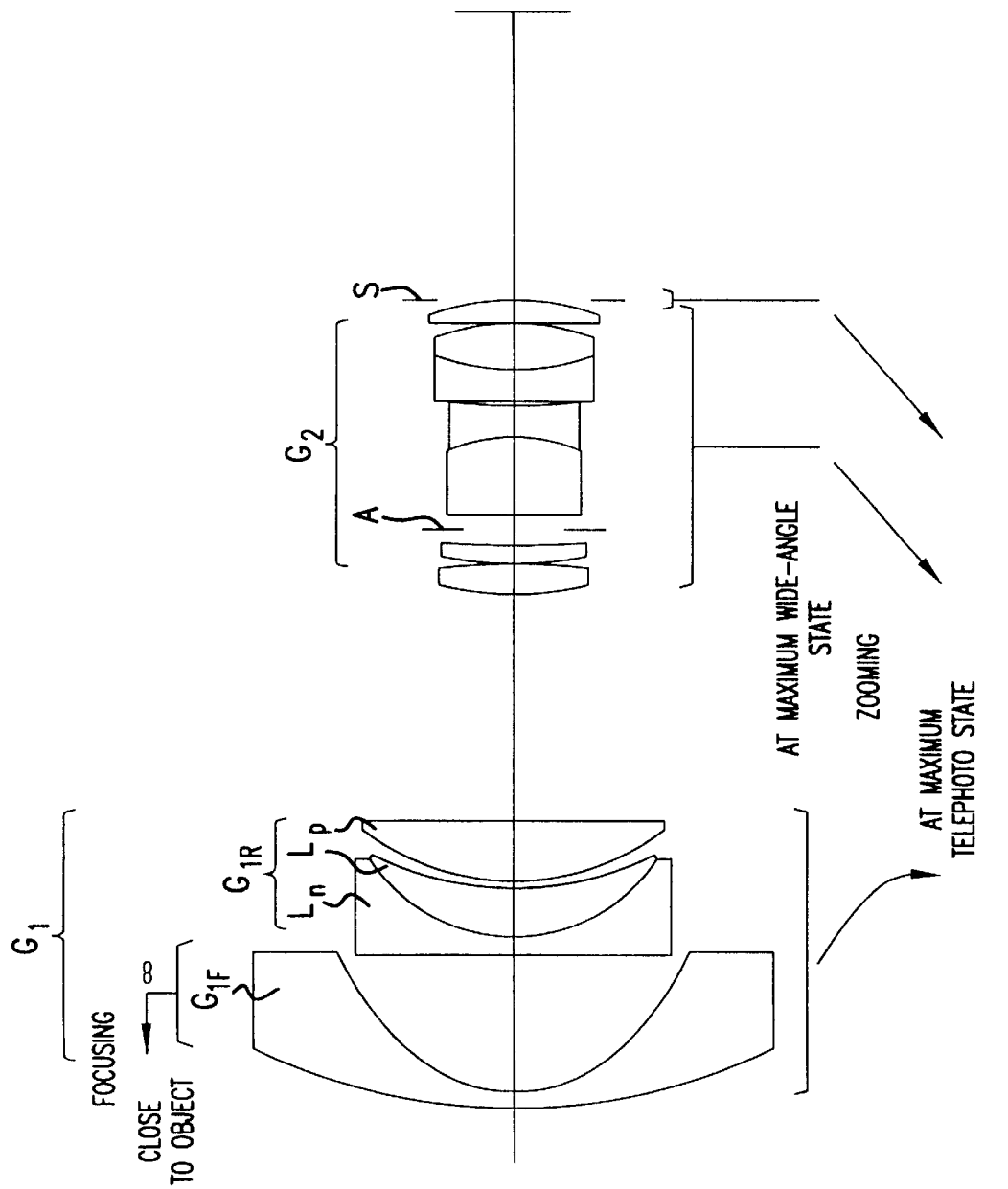
FIG. 1 shows a lens structure of a first embodiment of the invention.
Figure 2:
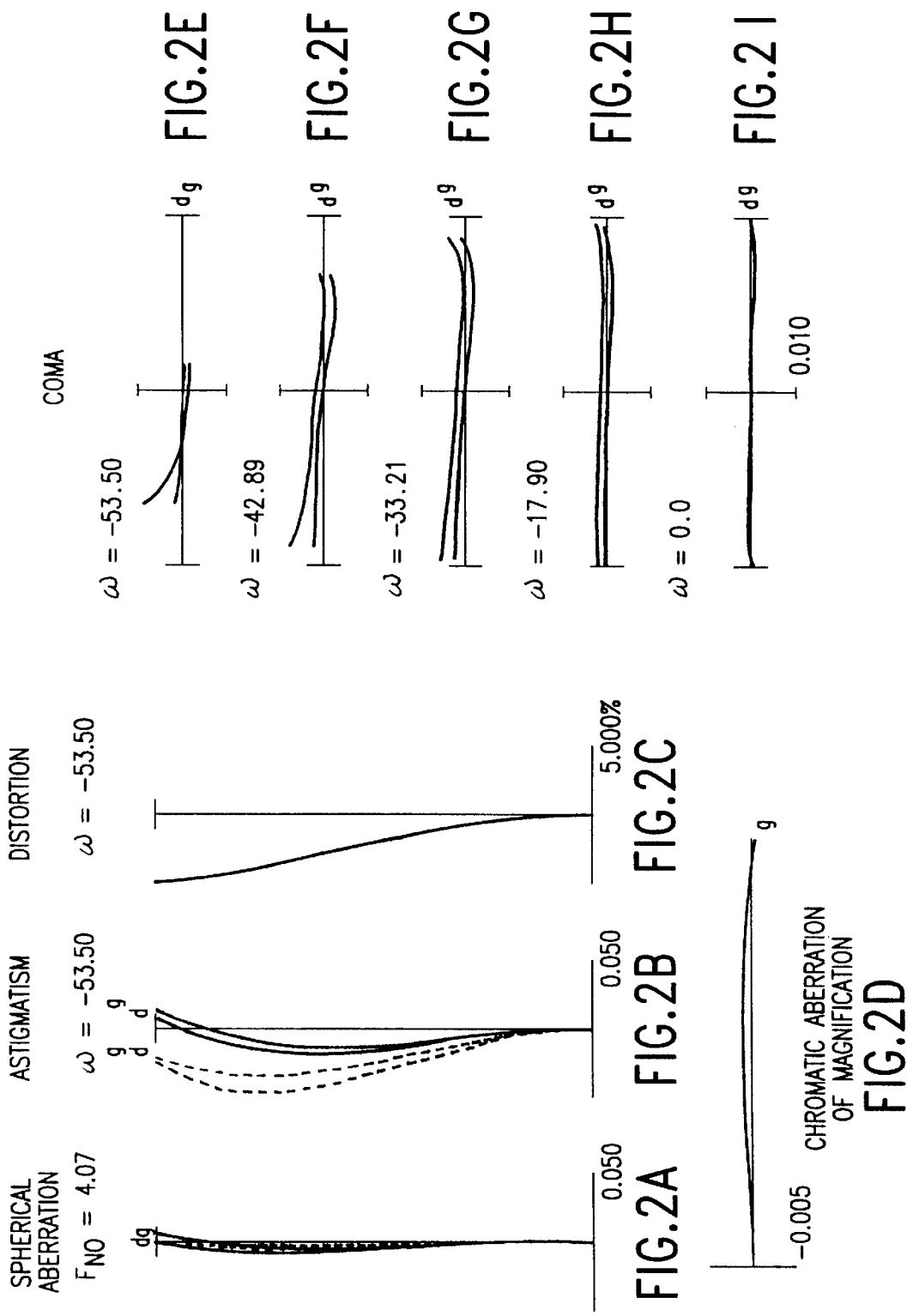
FIGS. 2A–I show various aberrations of the first embodiment at a maximum wide-angle state during infinite focus state.
Figure 3:
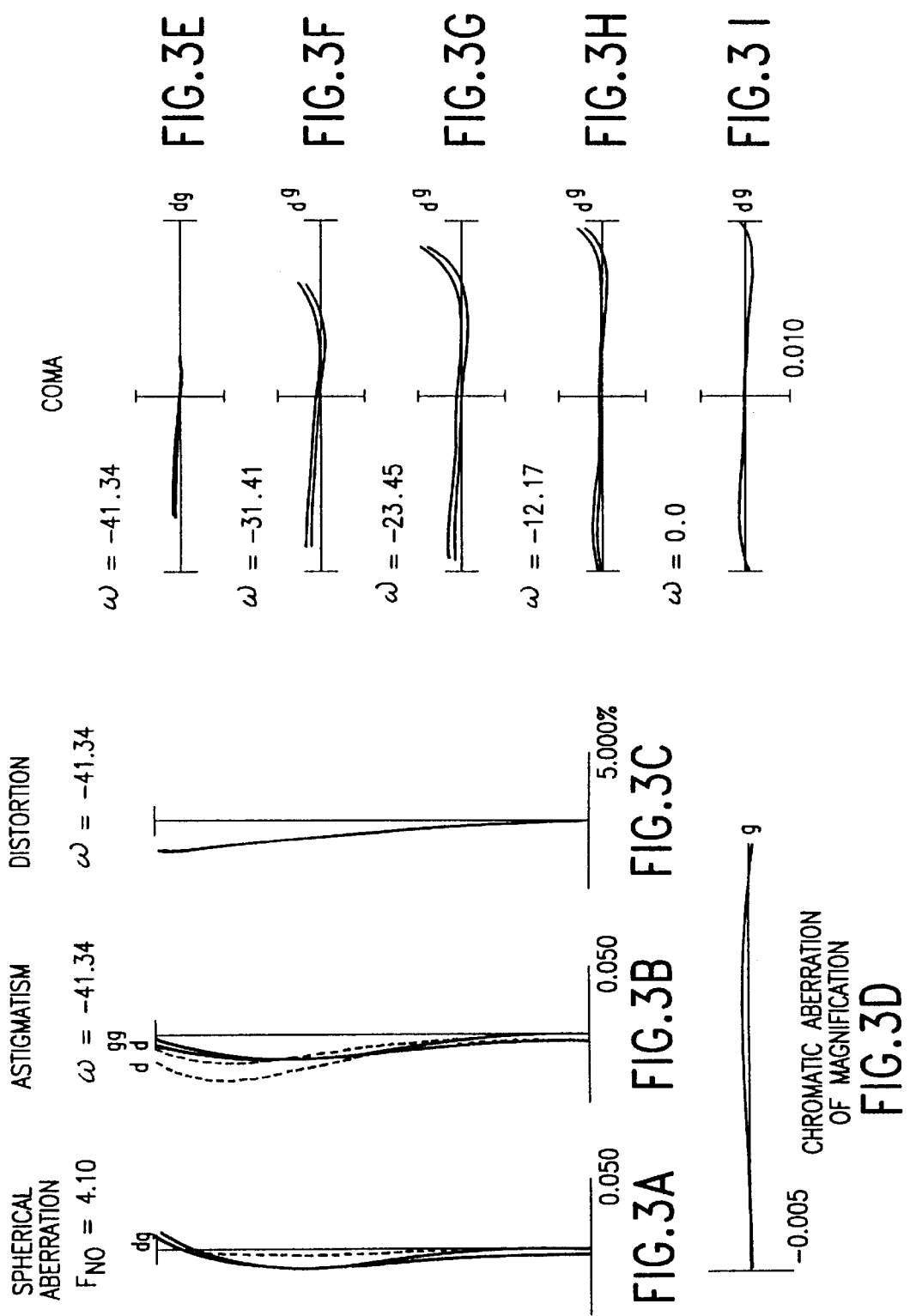
FIGS. 3A–I show various aberrations of the first embodiment at the intermediate distance during an infinite focus state.
Figure 4:
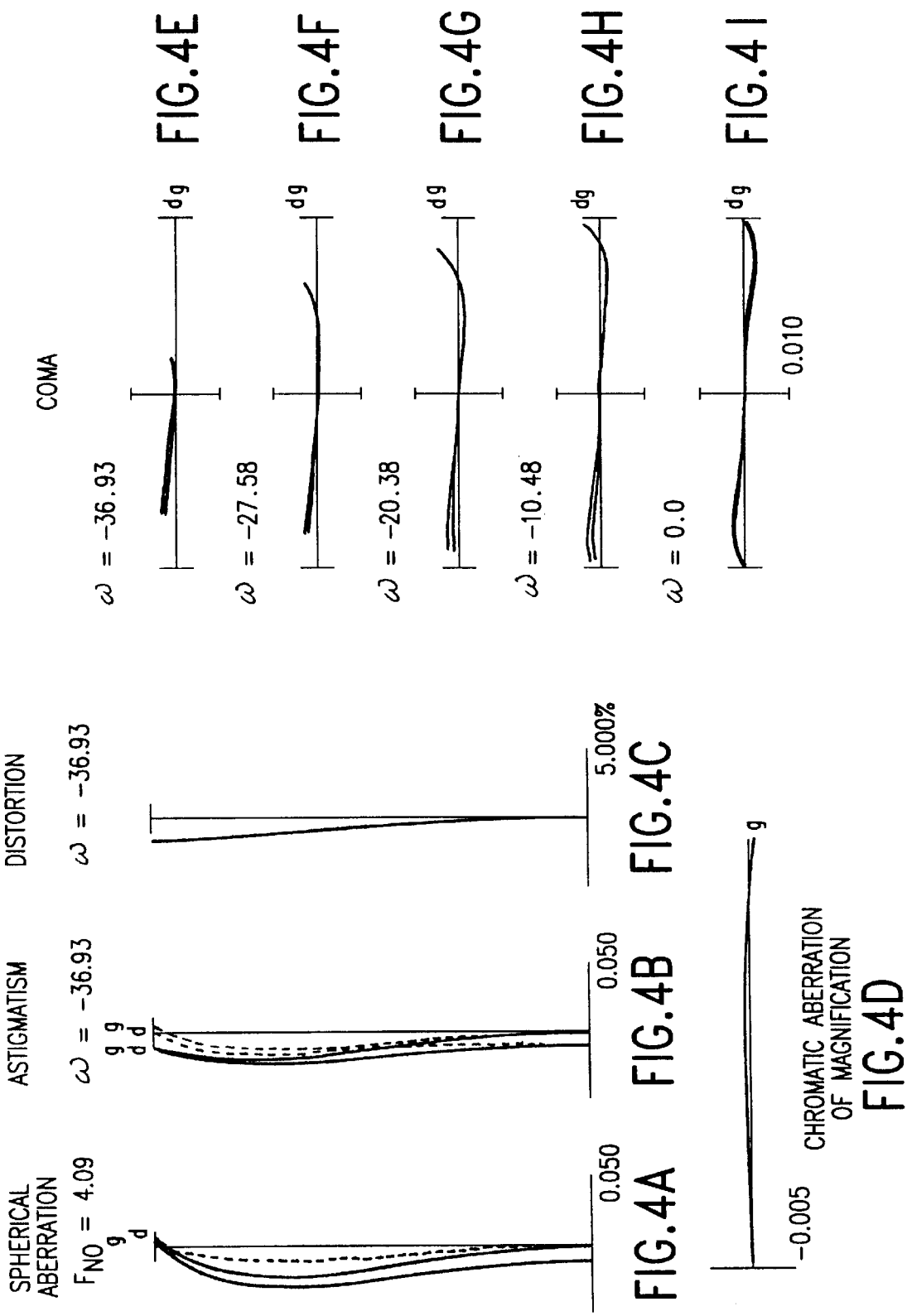
FIGS. 4A–I show various aberrations of the first embodiment at a maximum telephoto state during an infinite focus state.
Figure 5:
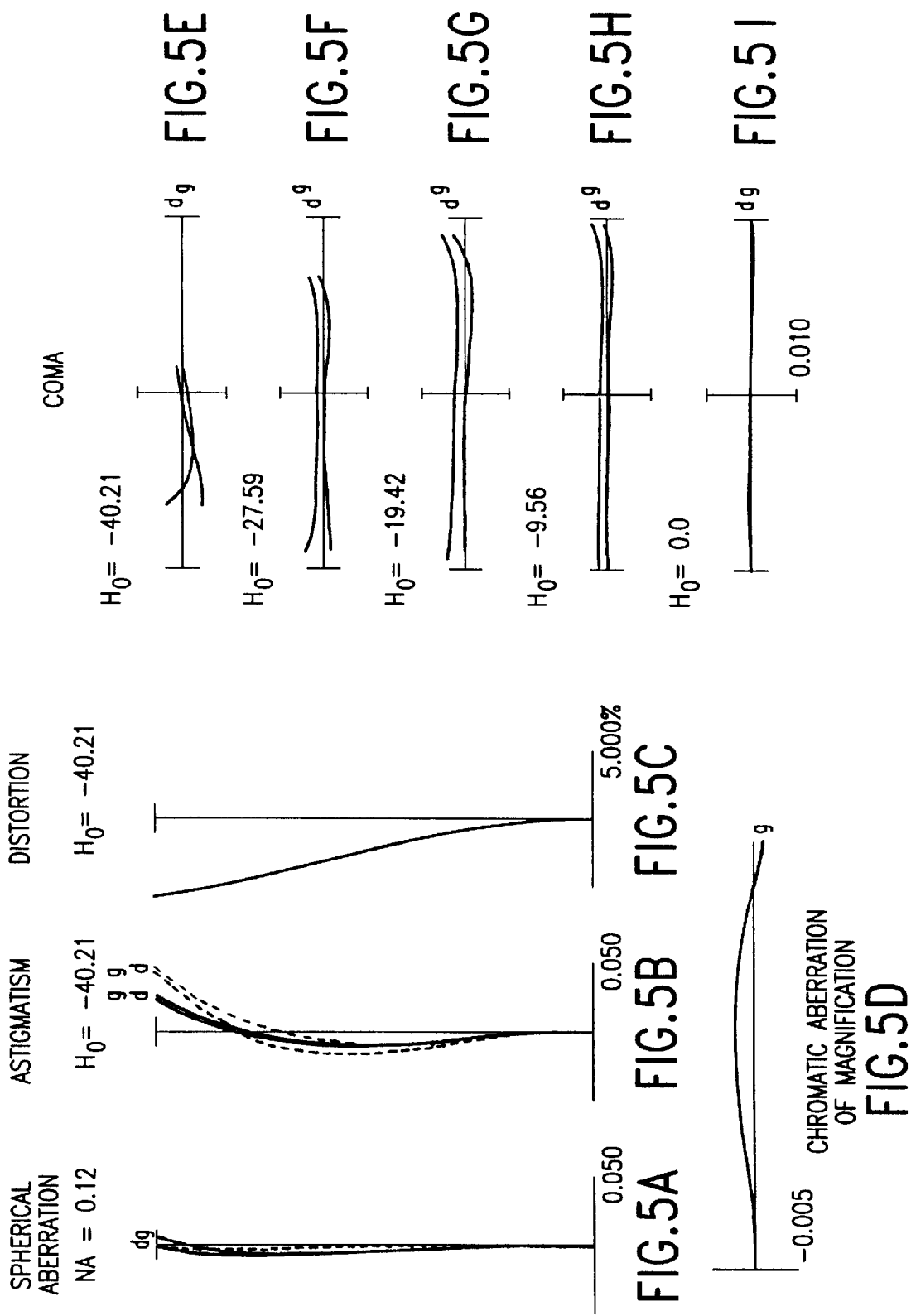
FIGS. 5A–I show various aberrations of the first embodiment at a maximum wide-angle state during a magnification of $-1/30$.
Figure 6:
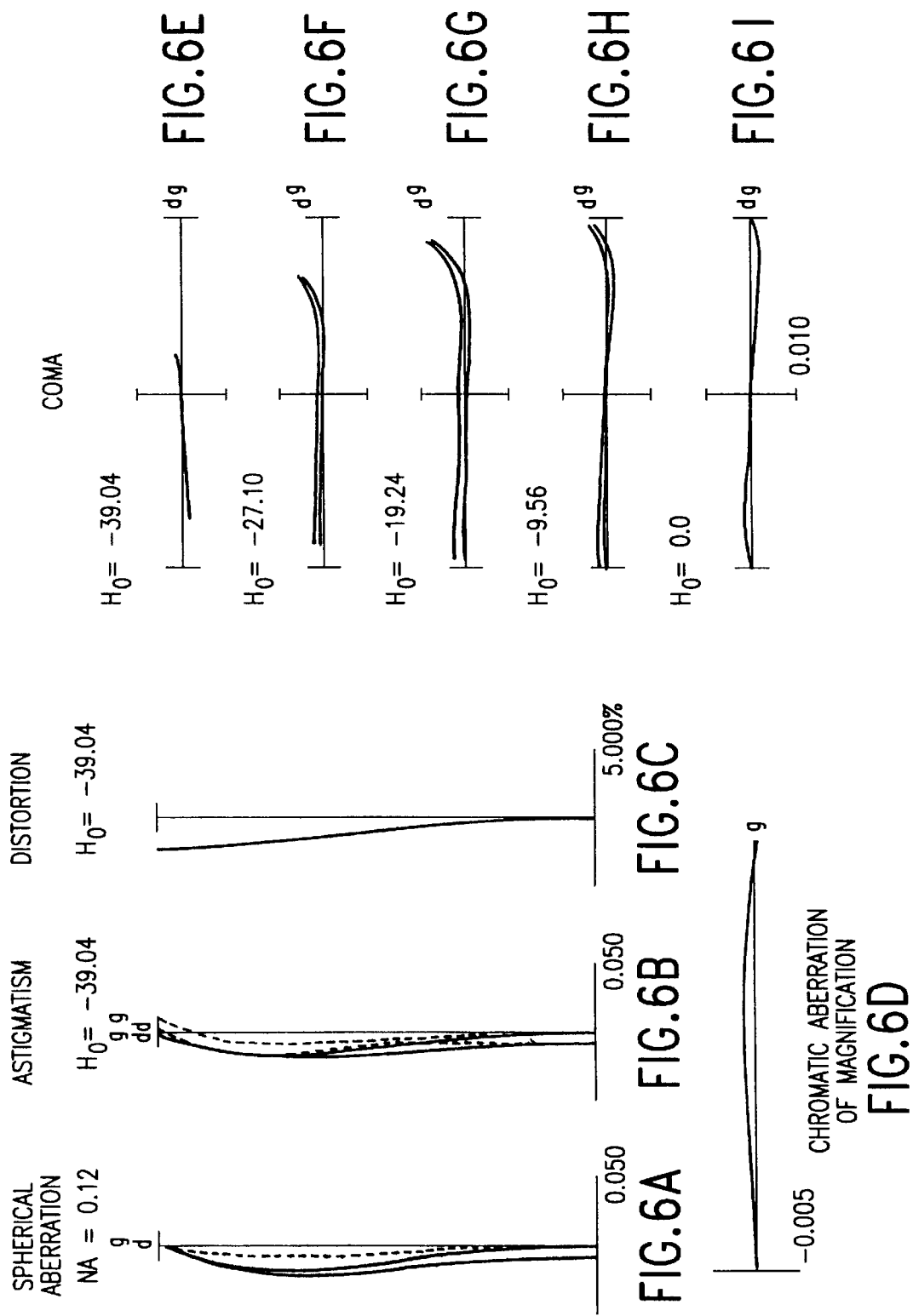
FIGS. 6A–I show various aberrations of the first embodiment at an intermediate distance during a magnification of $-1/30$.
Figure 7:
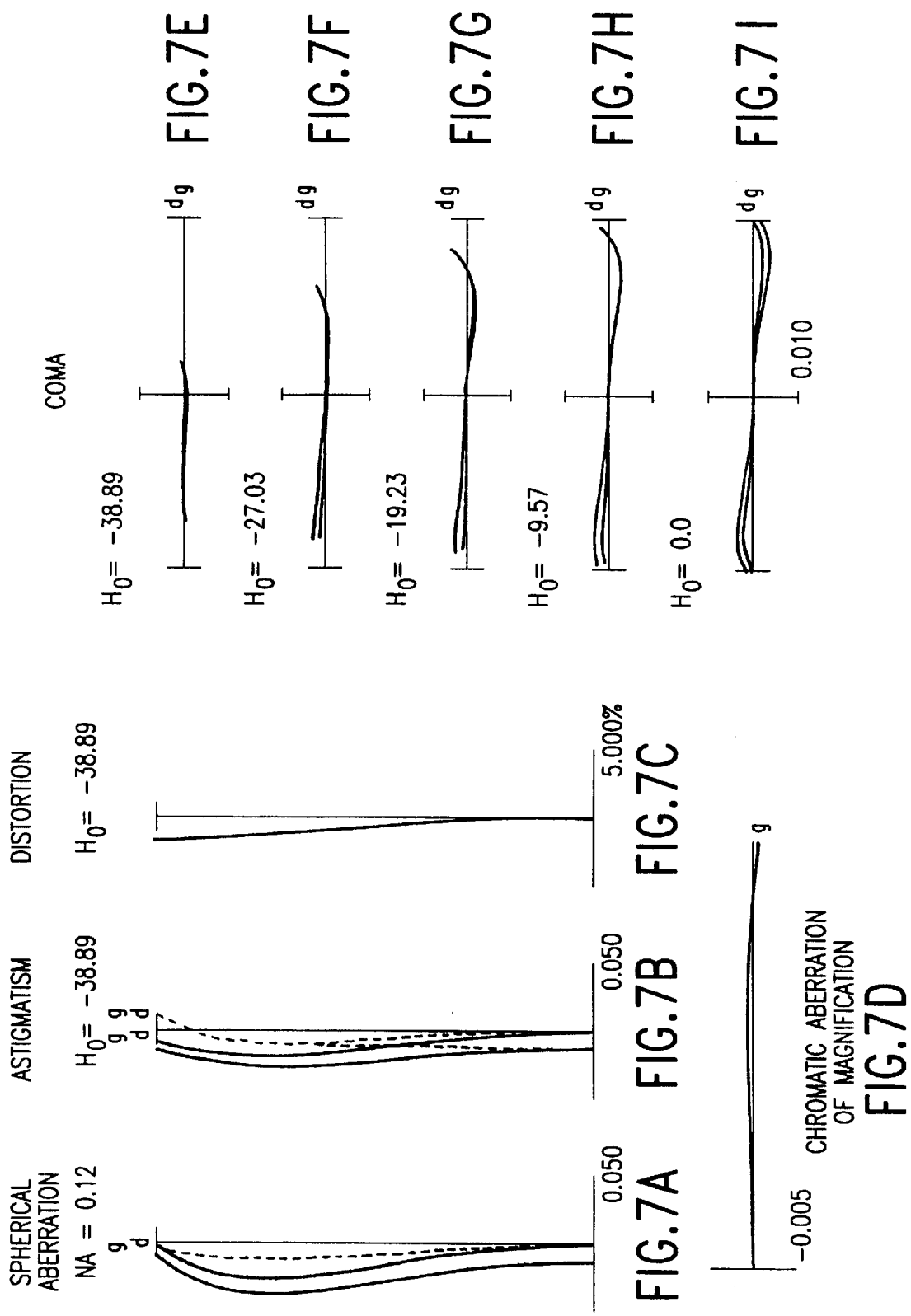
FIGS. 7A–I show various aberrations of the first embodiment at a maximum telephoto state during a magnification of $-1/30$.
Figure 8:
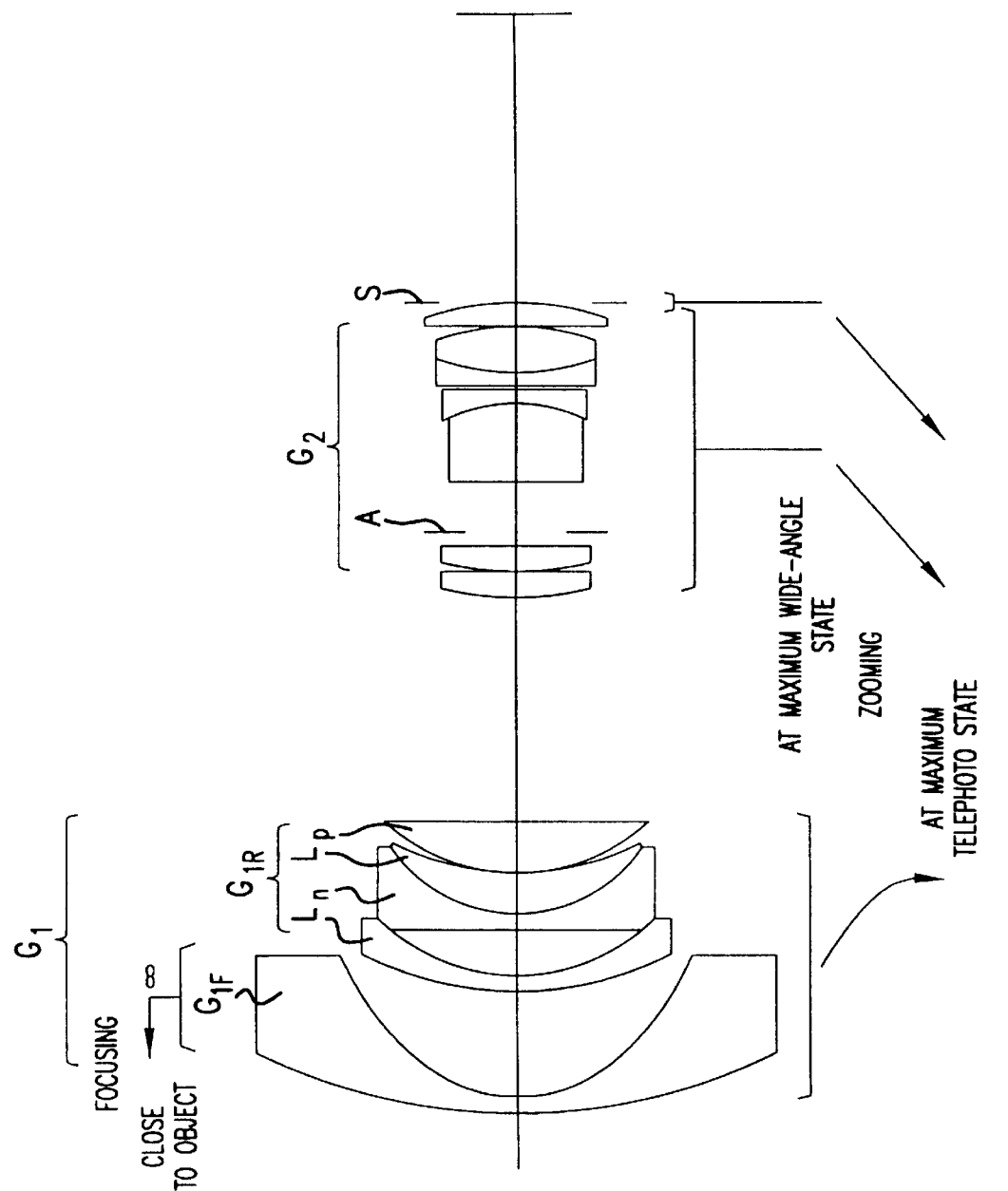
FIG. 8 shows a lens structure of a second embodiment of the invention.
Figure 9:
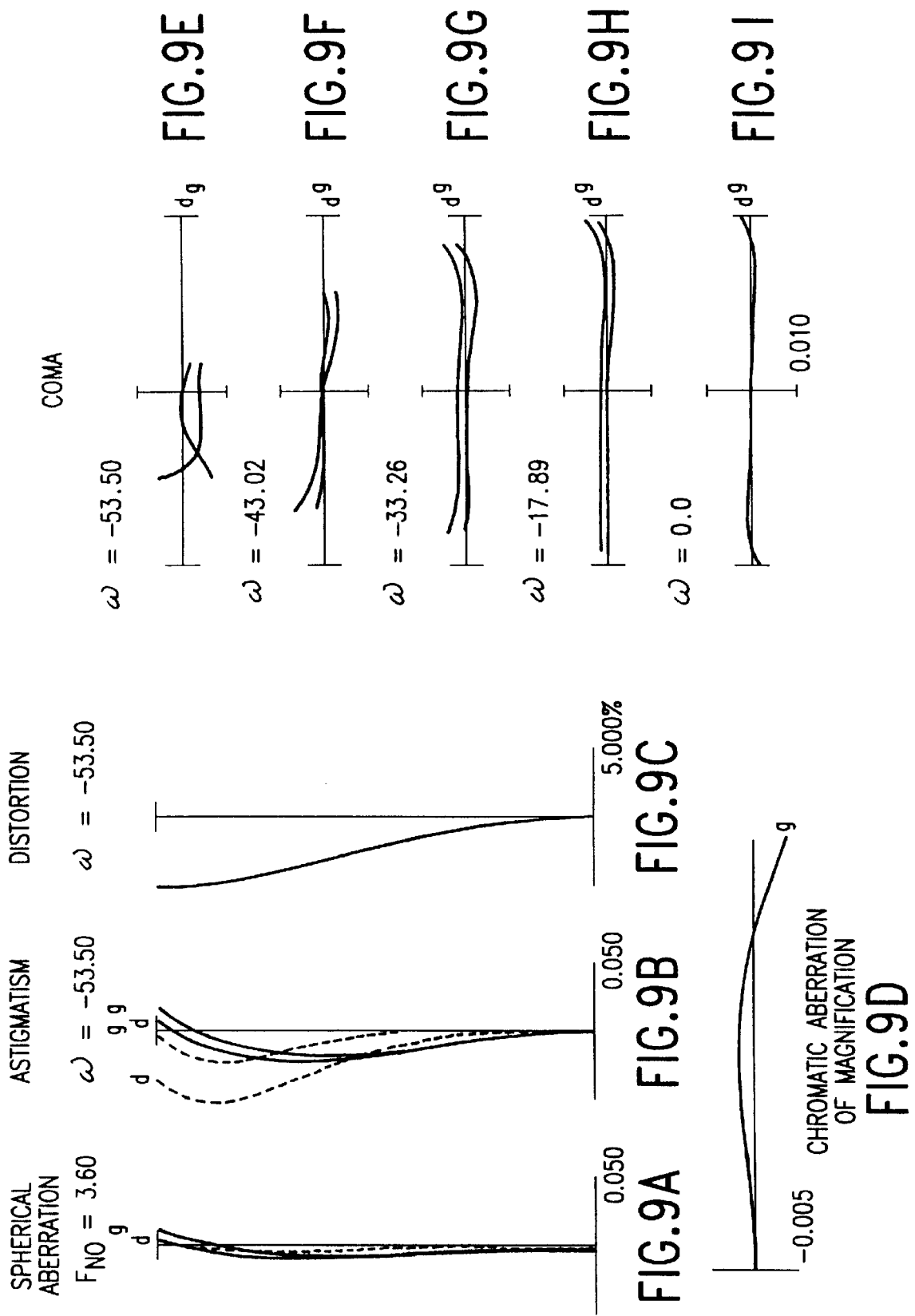
FIGS. 9A–I show various aberrations of the second embodiment at a maximum wide-angle state during an infinite focus state.
Figure 10:
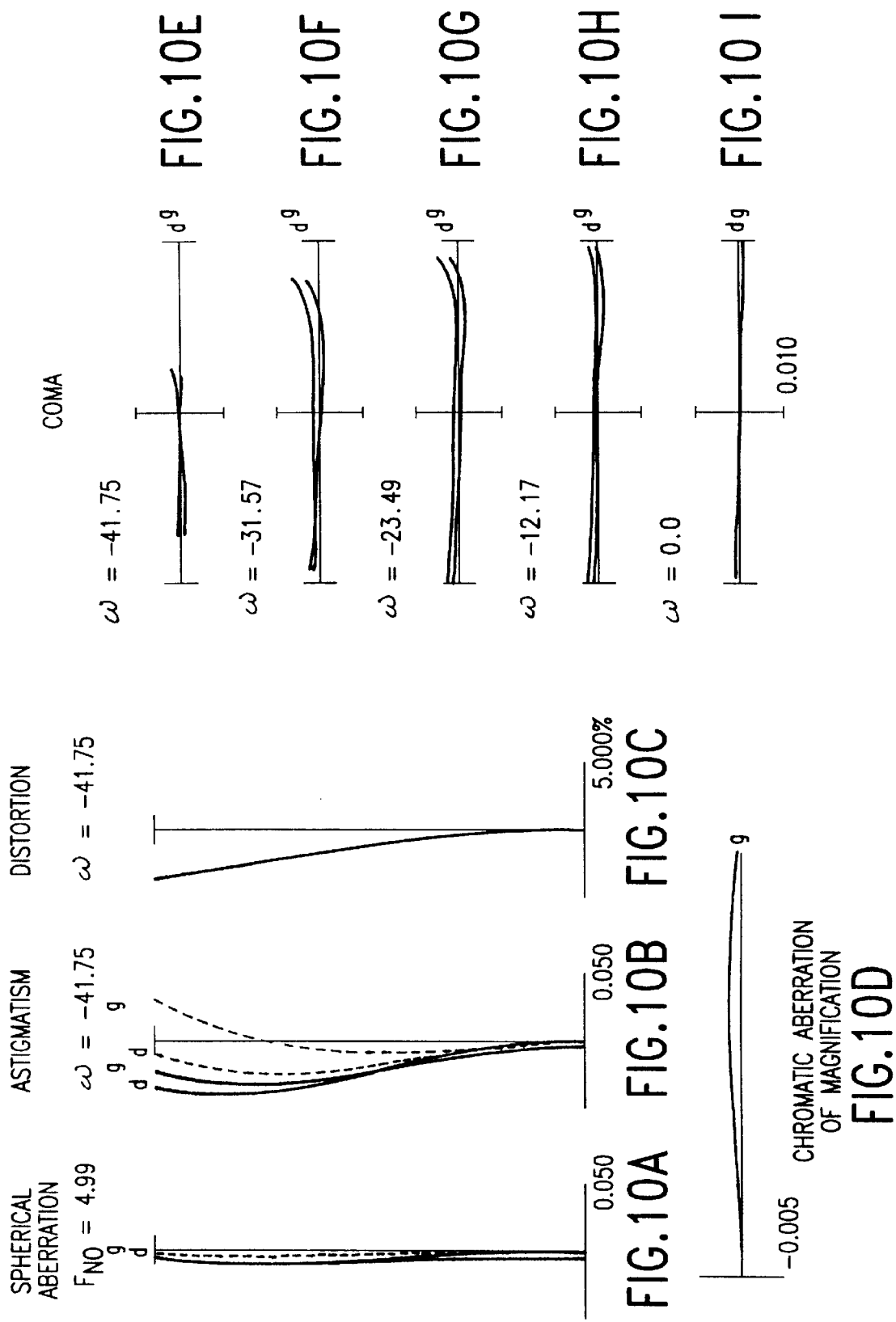
FIGS. 10A–I show various aberrations of the second embodiment at an intermediate distance during an infinite focus state.
Figure 11:
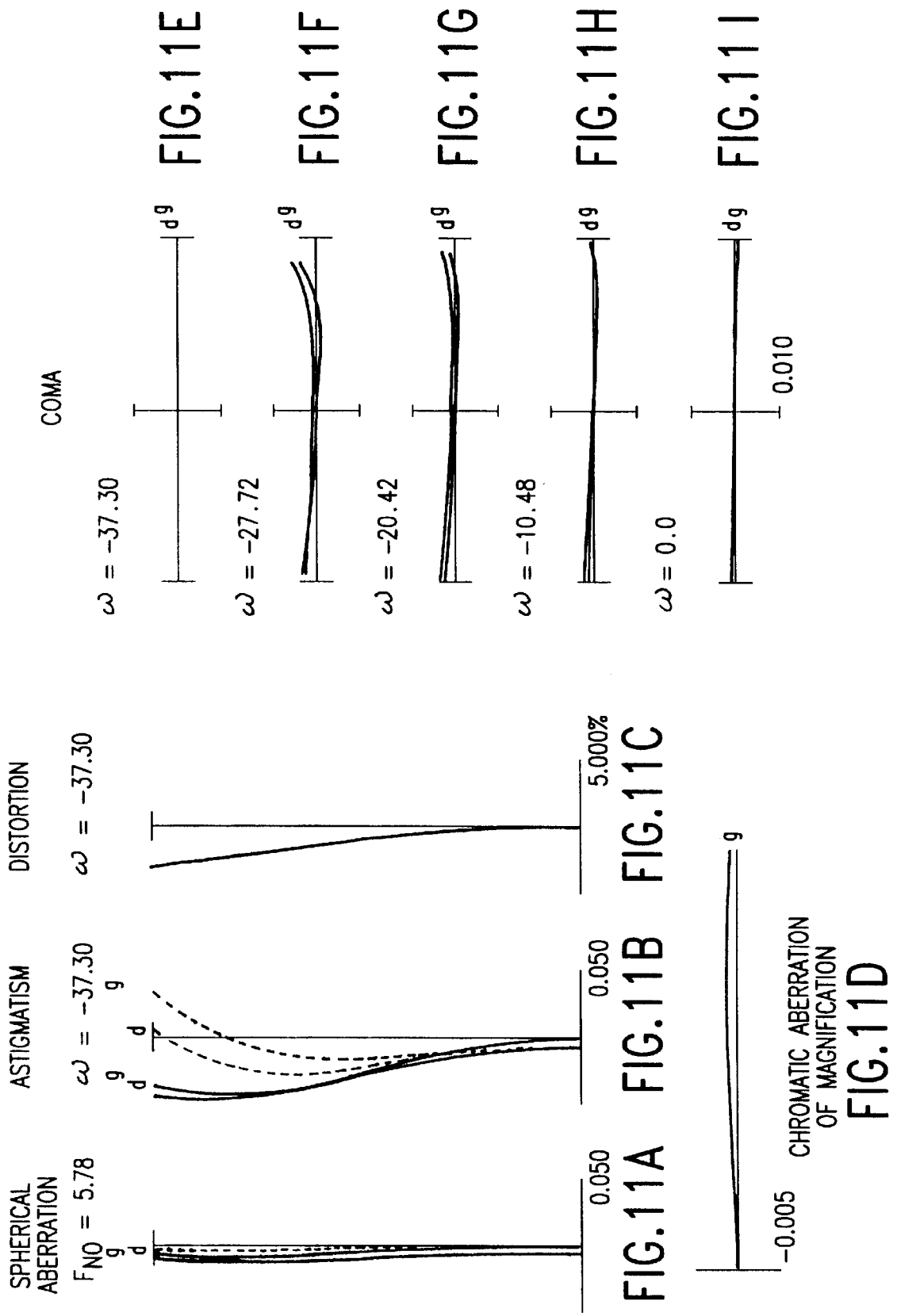
FIGS. 11A–I show various aberrations of the second embodiment at a maximum telephoto state during an infinite focus state.
Figure 12:
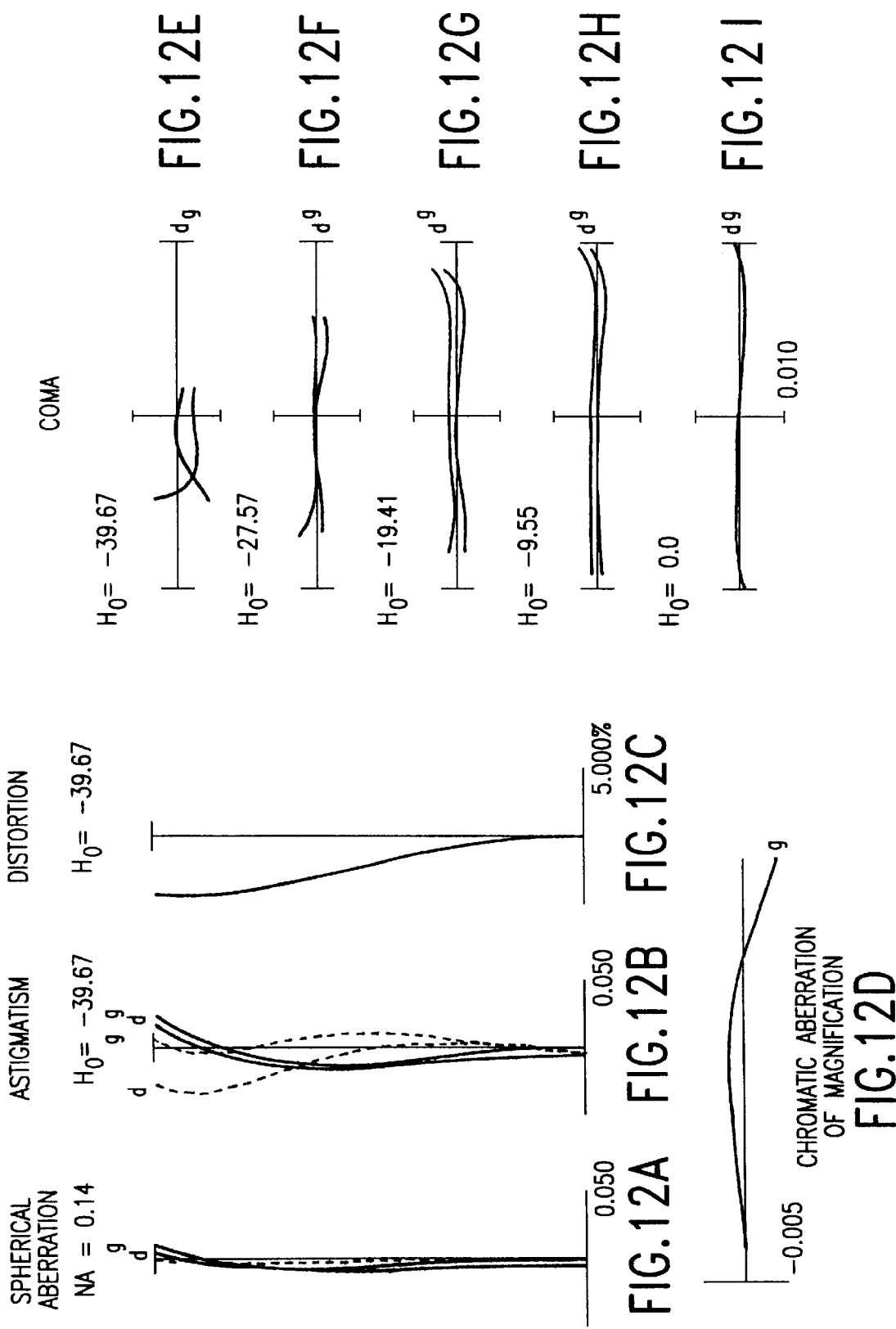
FIGS. 12A–I show various aberrations of the second embodiment at a maximum wide-angle state during a magnification of $-1/30$.
Figure 13:
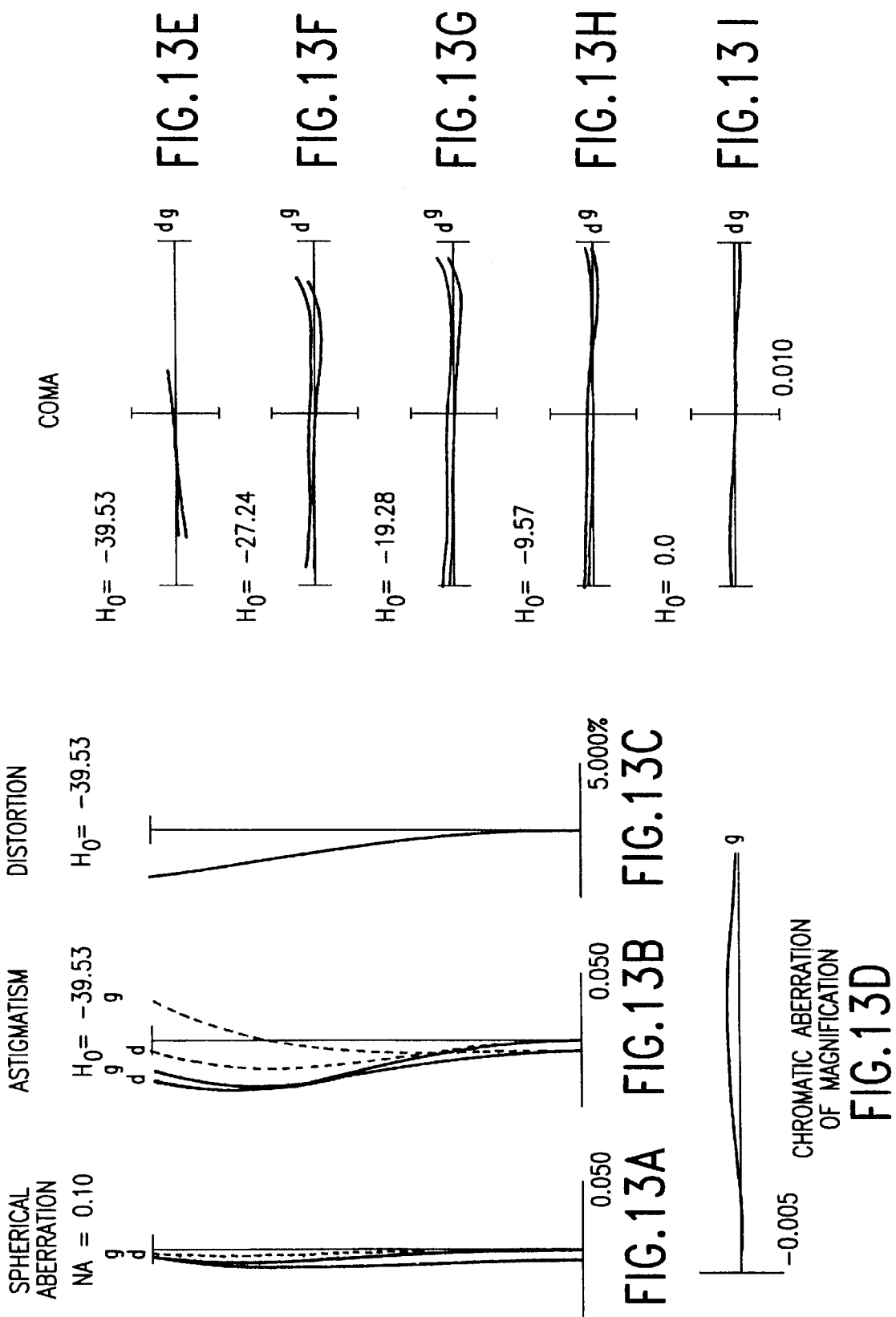
FIGS. 13A–I show various aberrations of the second embodiment at an intermediate distance during a magnification of $-1/30$.
Figure 14:
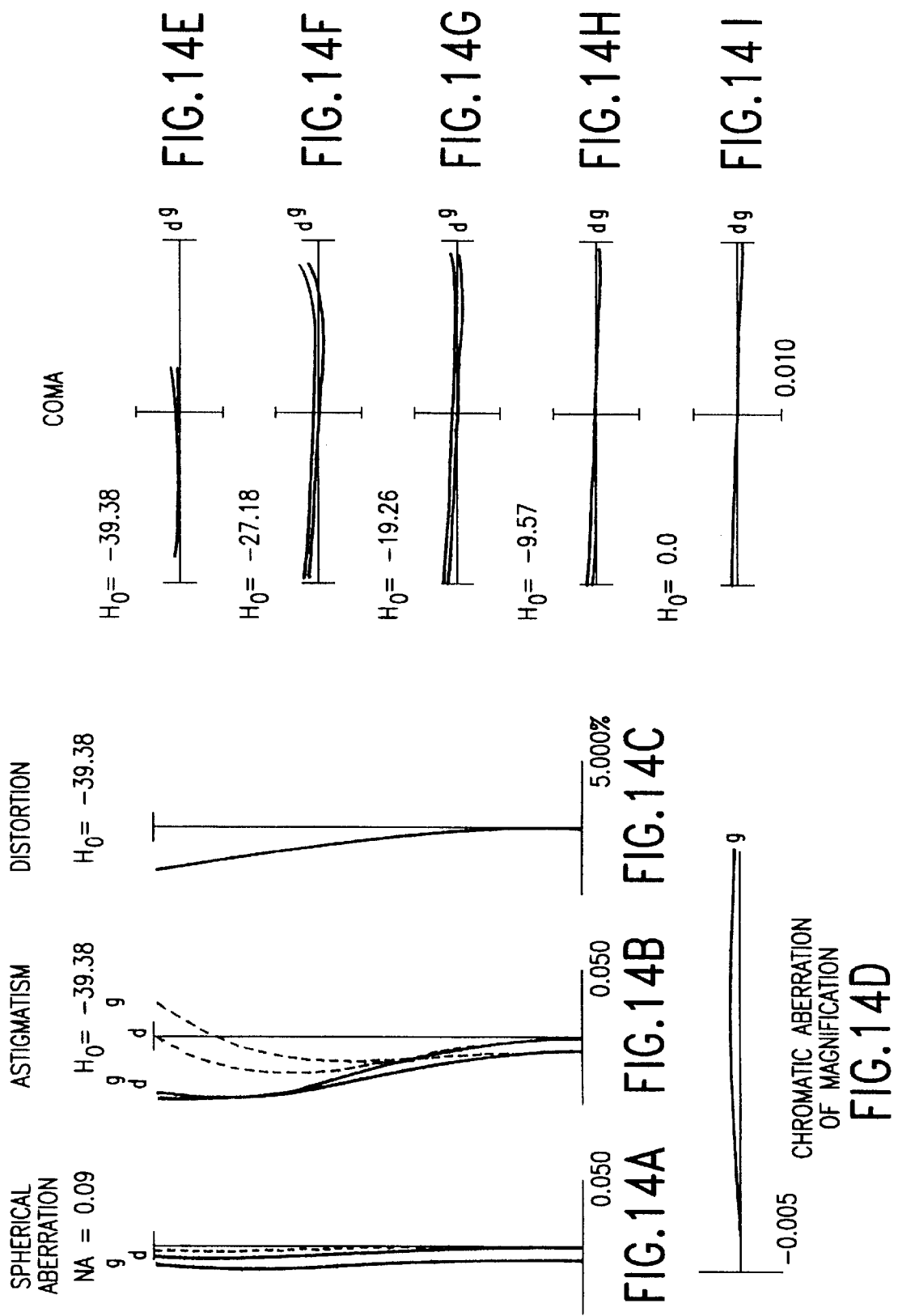
FIGS. 14A–I show various aberrations of the second embodiment at a maximum telephoto state during a magnification of $-1/30$.
Figure 15:
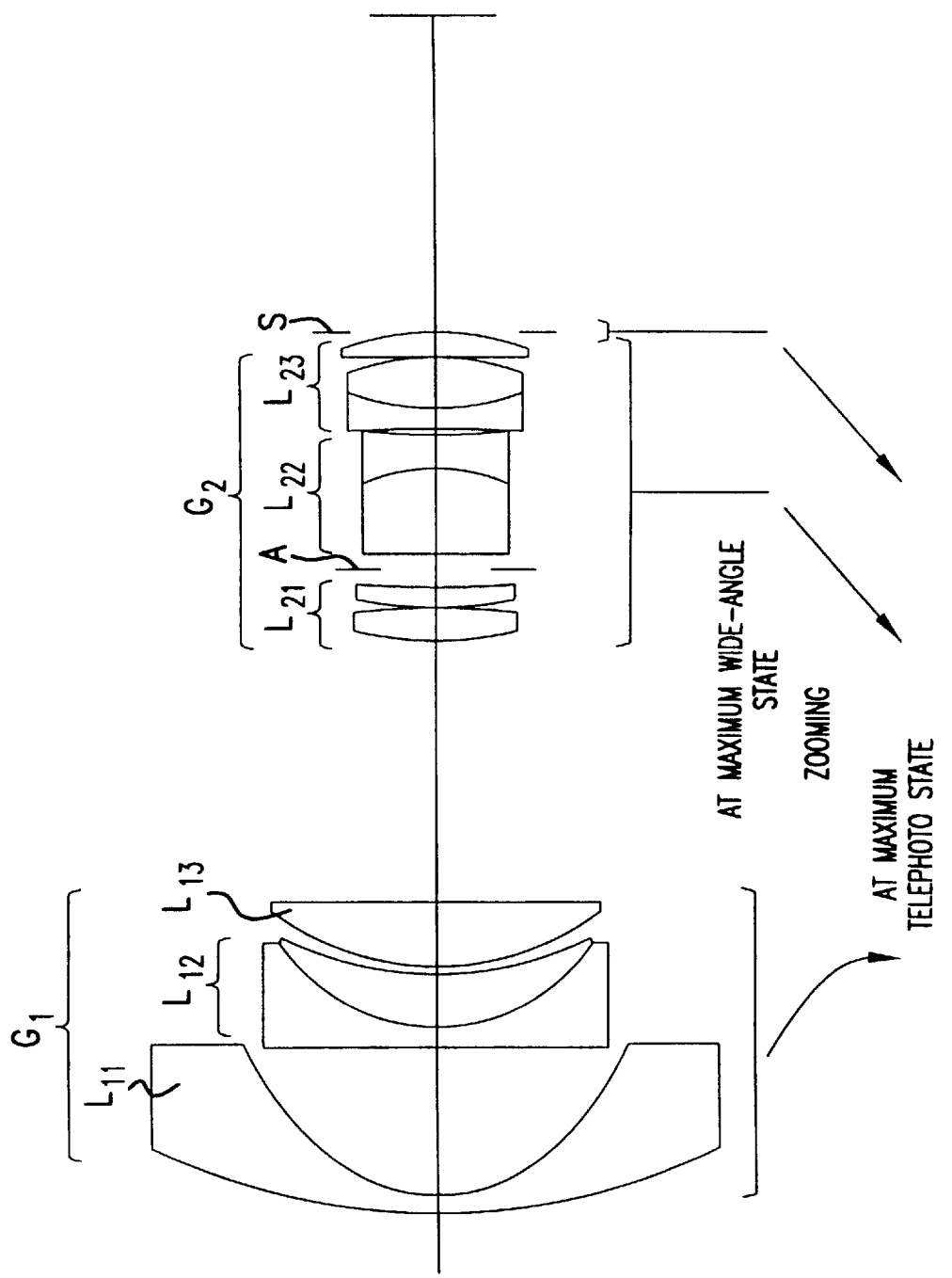
FIG. 15 is a lens structure of a third embodiment of the invention.
Figure 16:
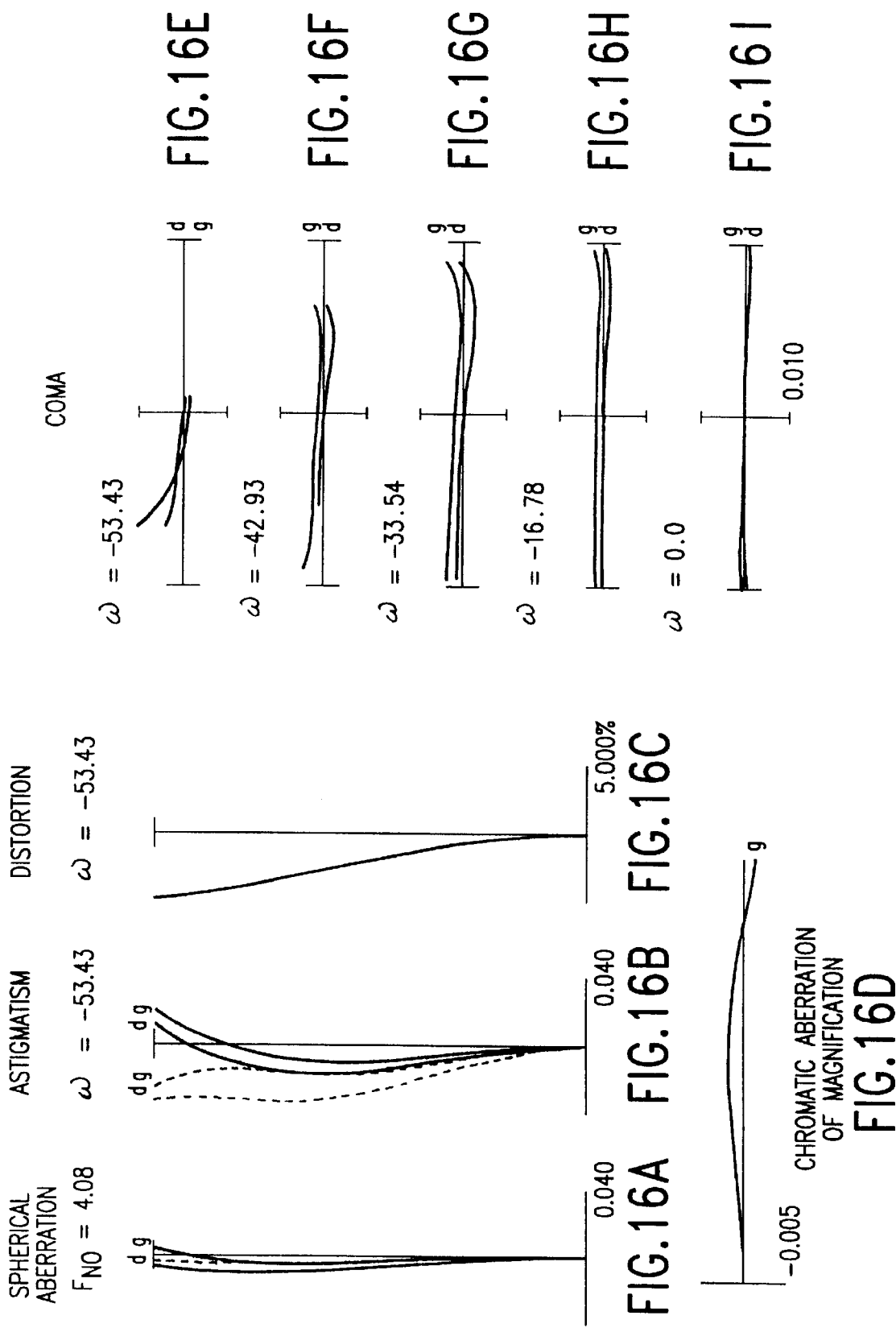
FIGS. 16A–I show various aberrations of the third embodiment at a maximum wide-angle state during an infinite focus state.
Figure 17:
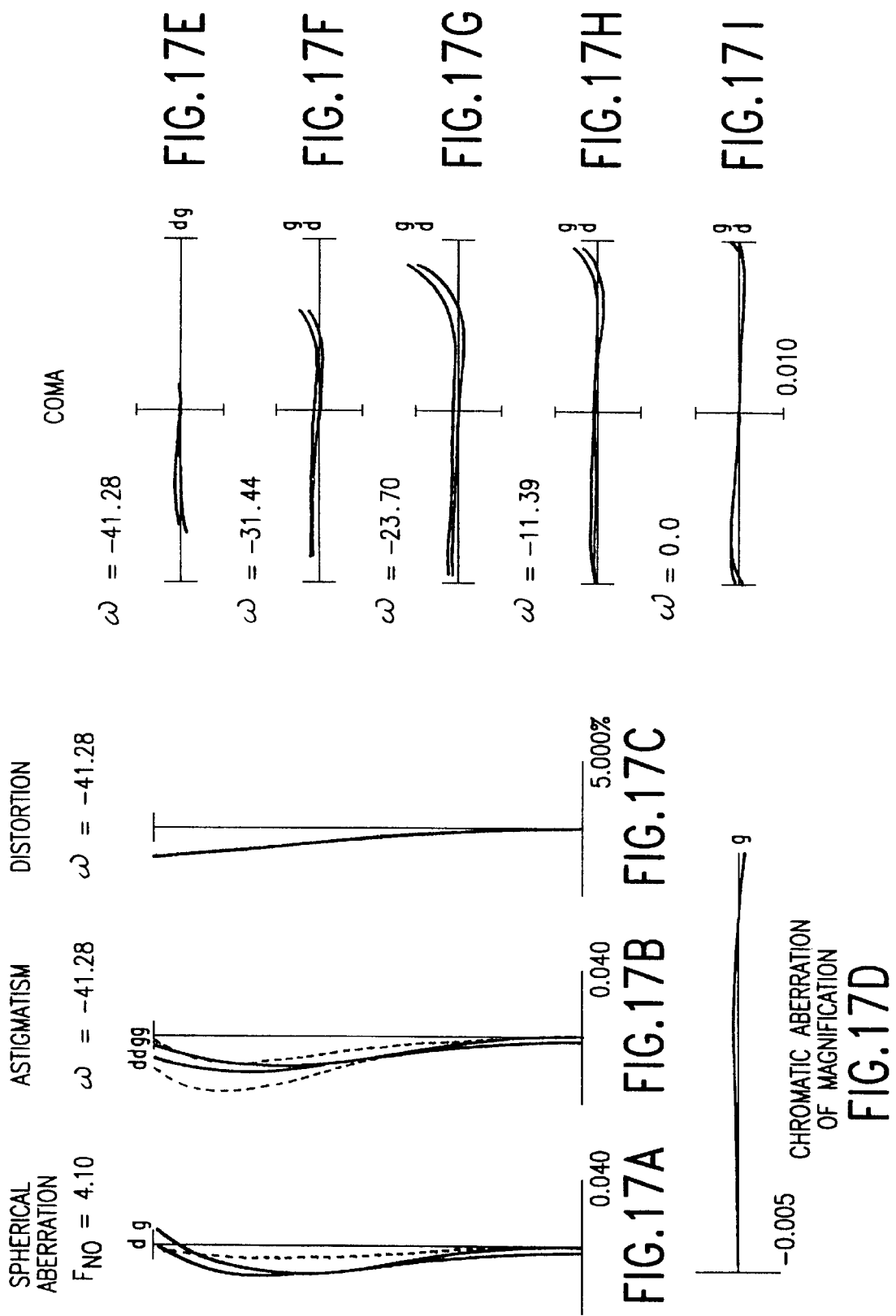
FIGS. 17A–I show various aberrations of the third embodiment at an intermediate distance during an infinite focus state.
Figure 18:
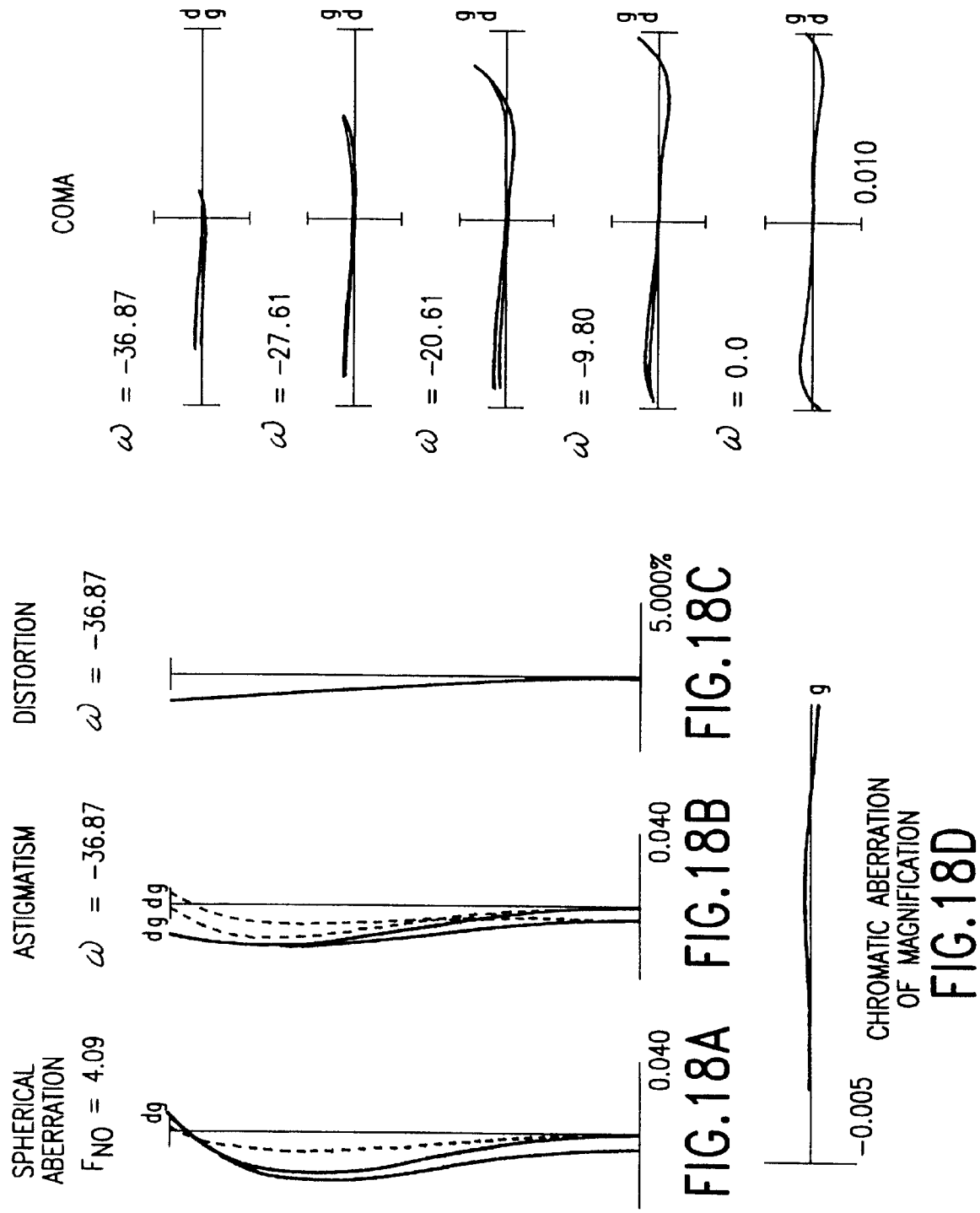
FIGS. 18A–I show various aberrations of the third embodiment at a maximum telephoto state during an infinite focus state.
Figure 19:
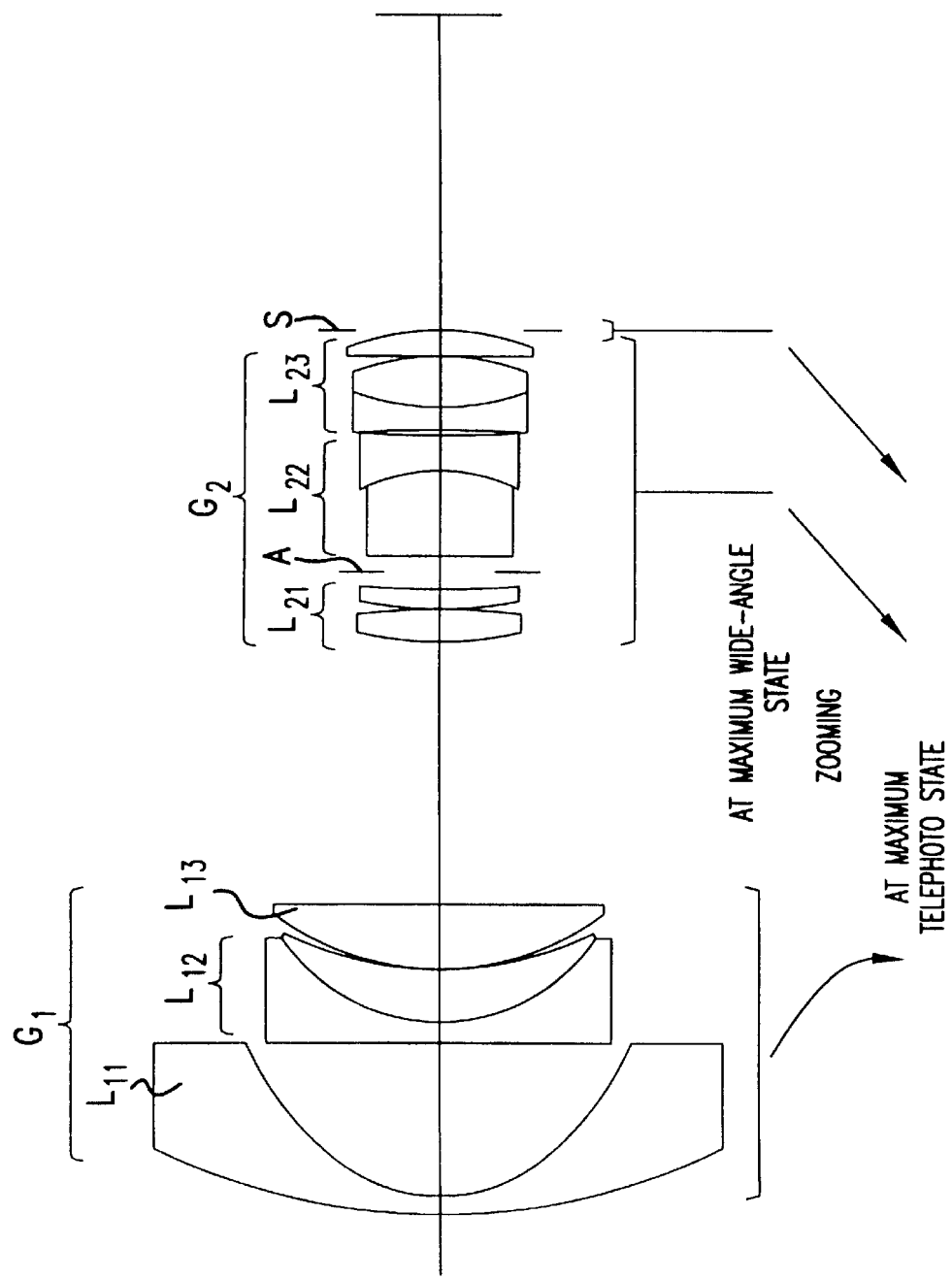
FIG. 19 is a lens structure of a fourth embodiment of the invention.
Figure 20:
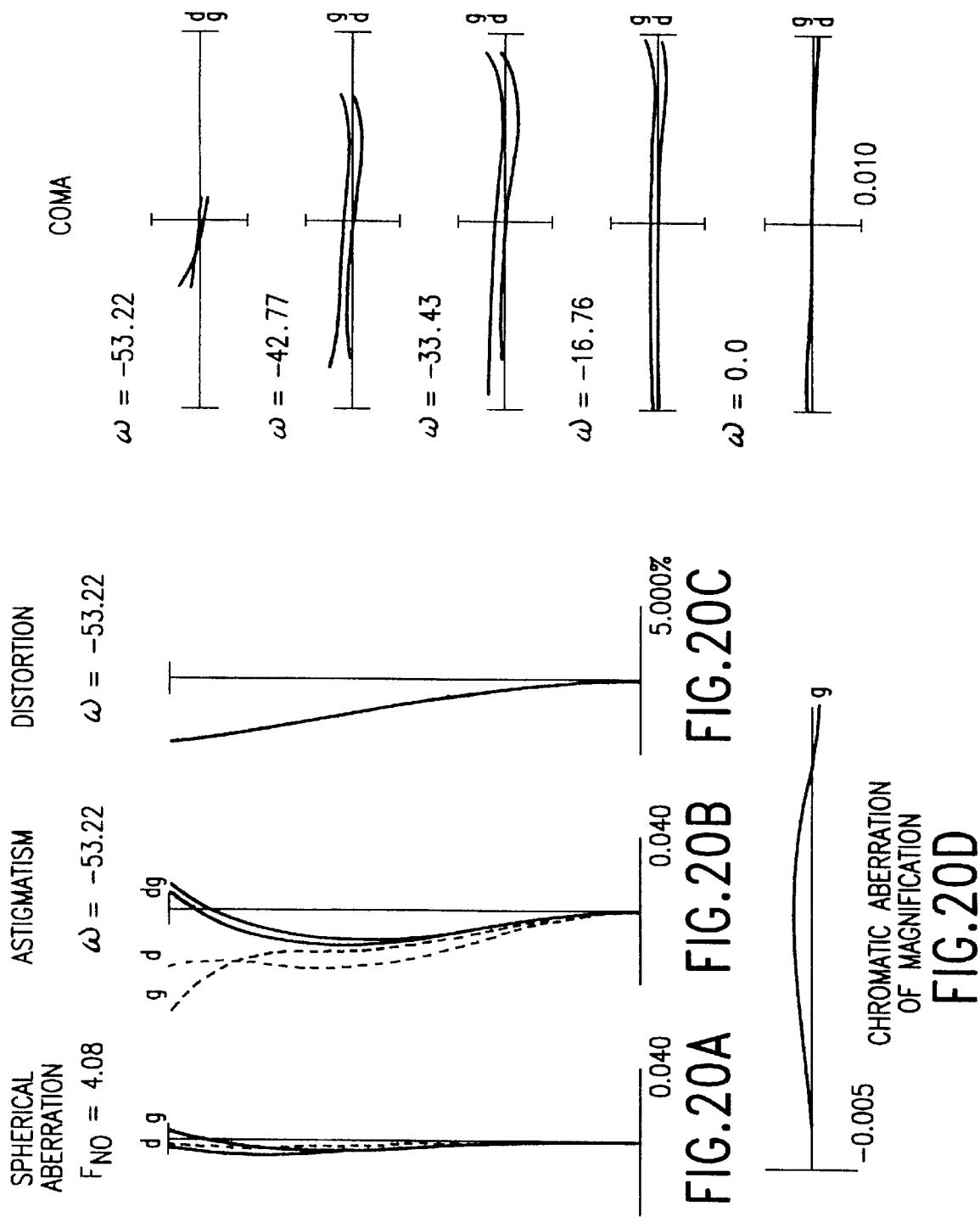
FIGS. 20A–I show various aberrations of the fourth embodiment at a maximum wide-angle state during an infinite focus state.
Figure 21:
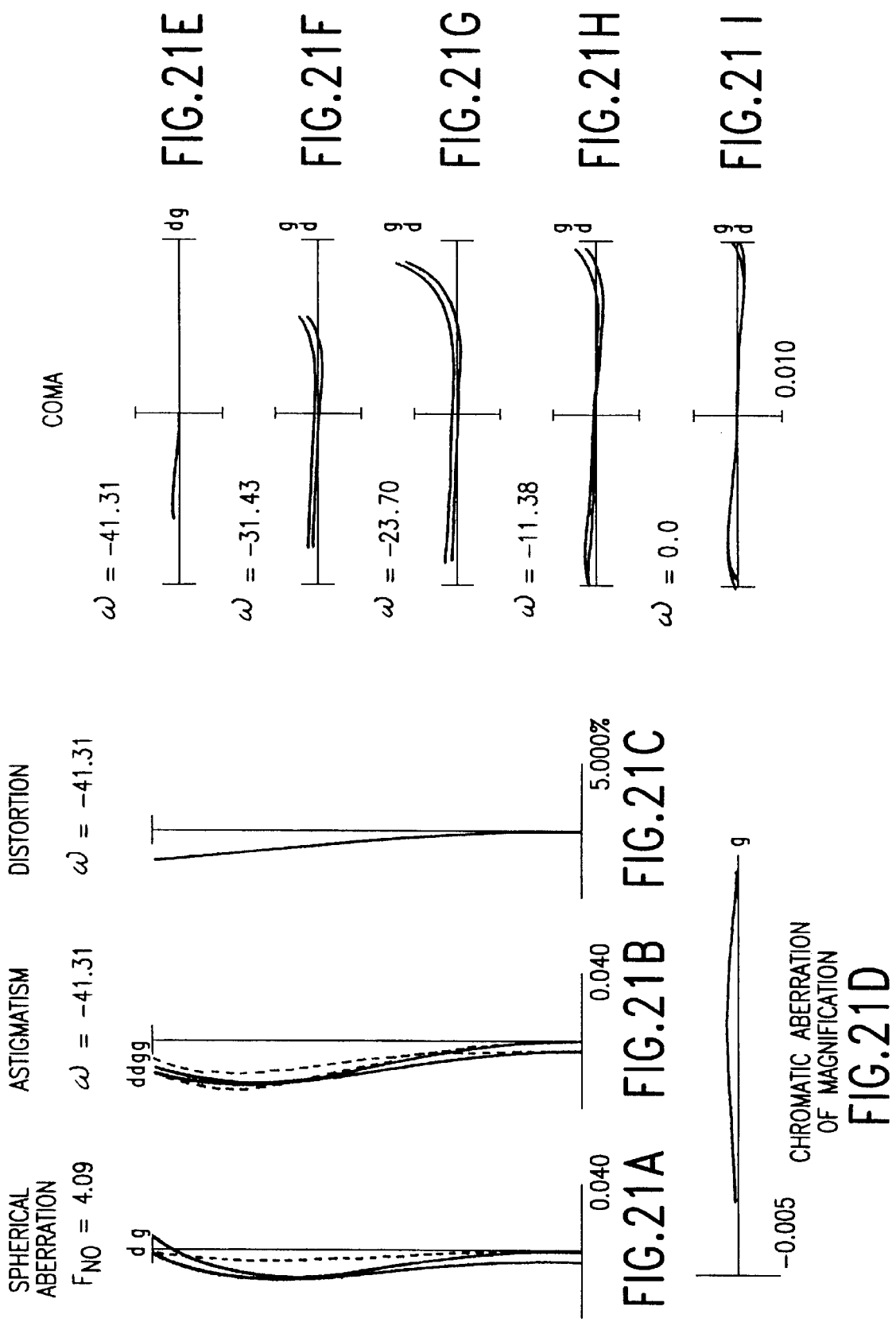
FIGS. 21A–I show various aberrations of the fourth embodiment at a intermediate distance during an infinite focus state.
Figure 22:
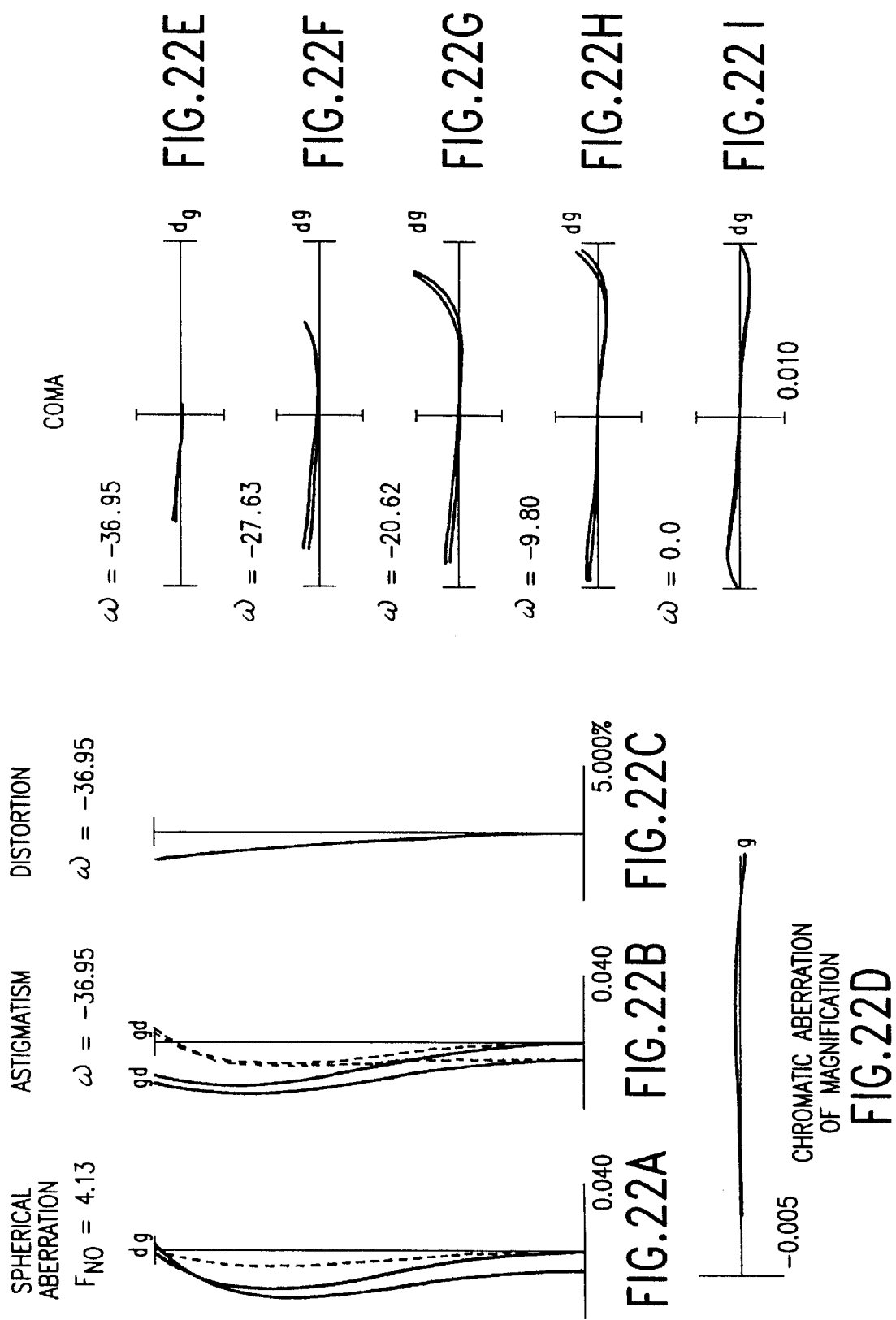
FIGS. 22A–I show various aberrations of the fourth embodiment at a maximum telephoto state during an infinite focus state.
Figure 23:
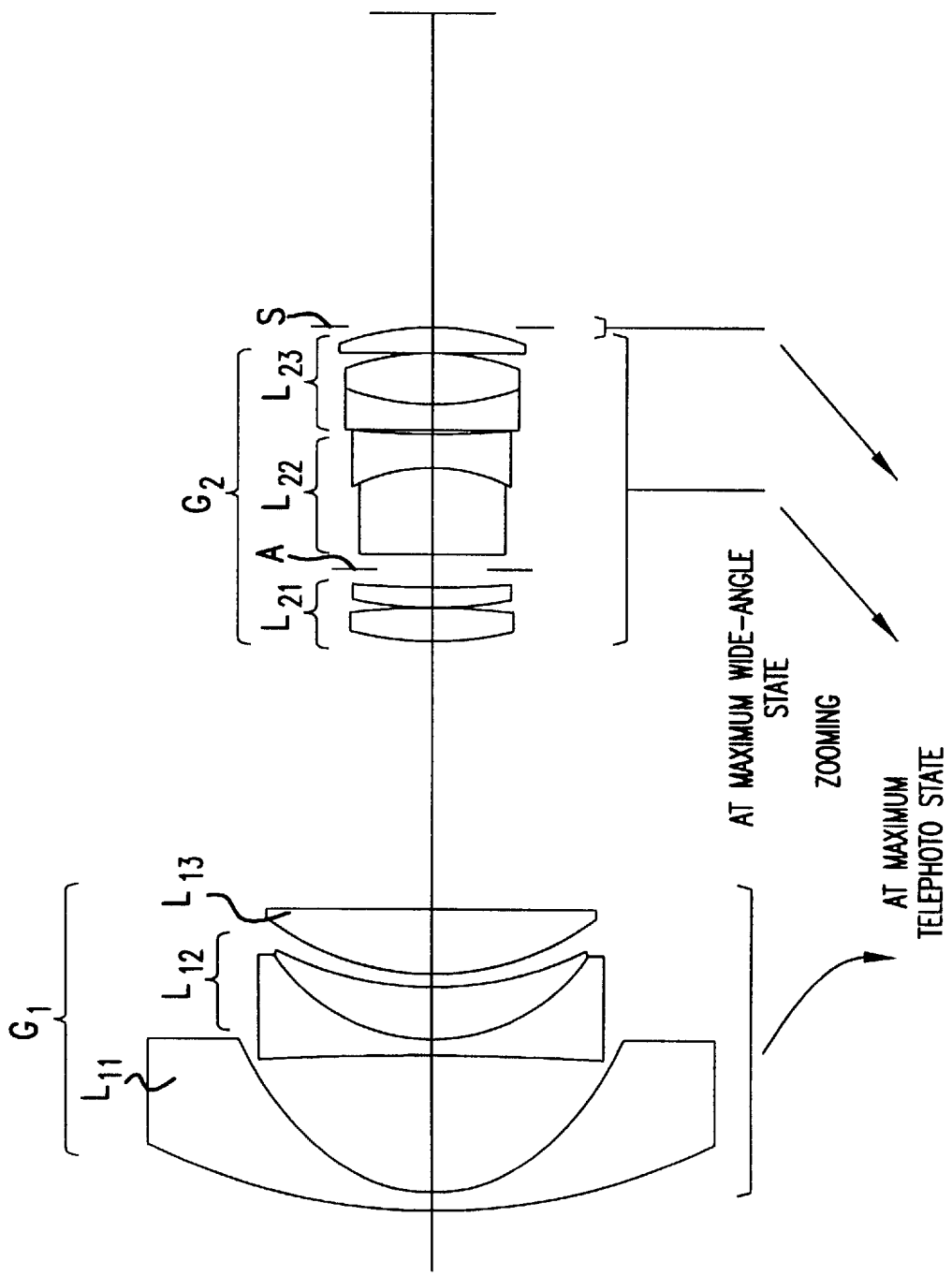
FIG. 23 is a lens structure of a fifth embodiment of the invention.
Figure 24:
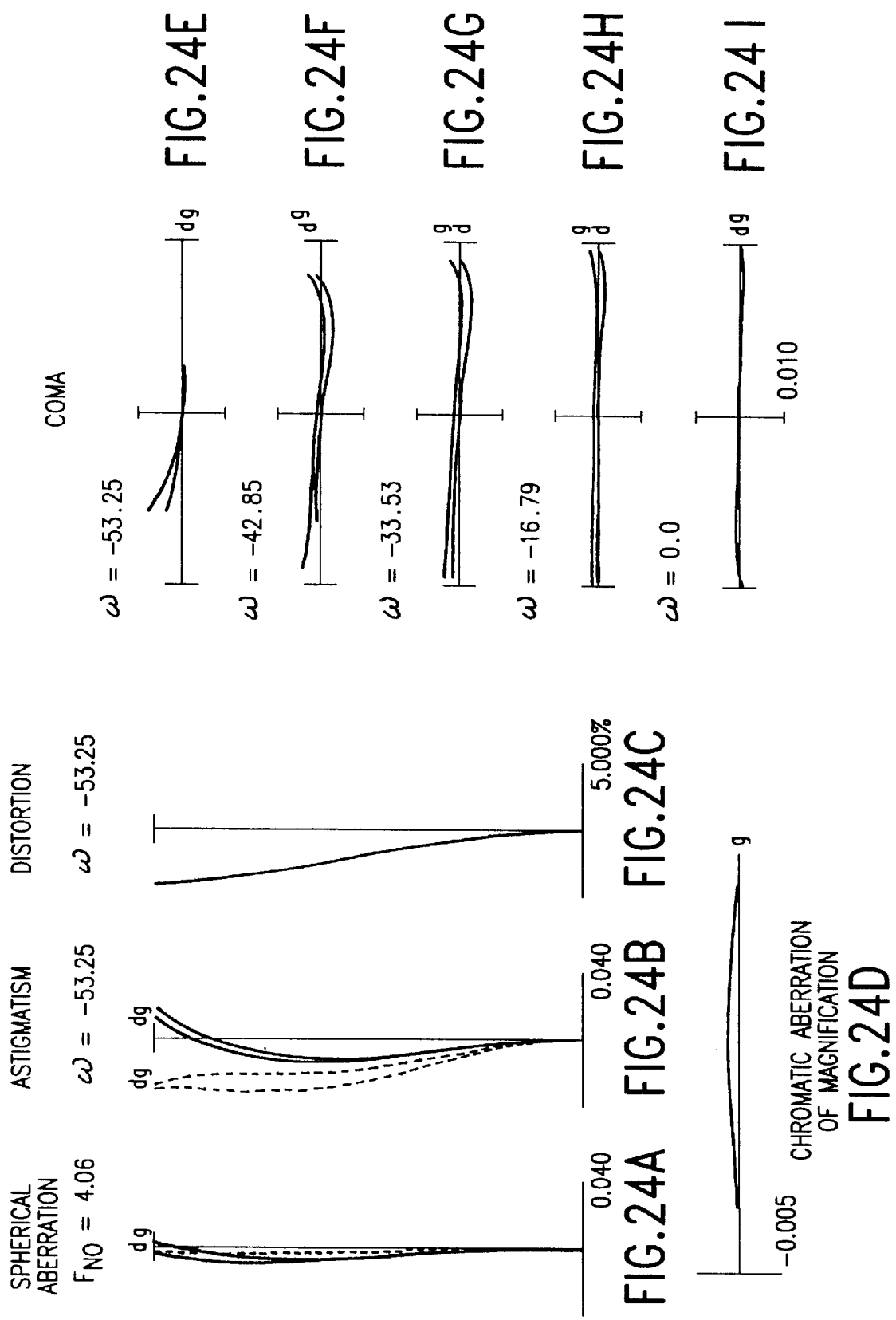
FIGS. 24A–I show various aberrations of the fifth embodiment at a maximum wide-angle state during an infinite focus state.
Figure 25:
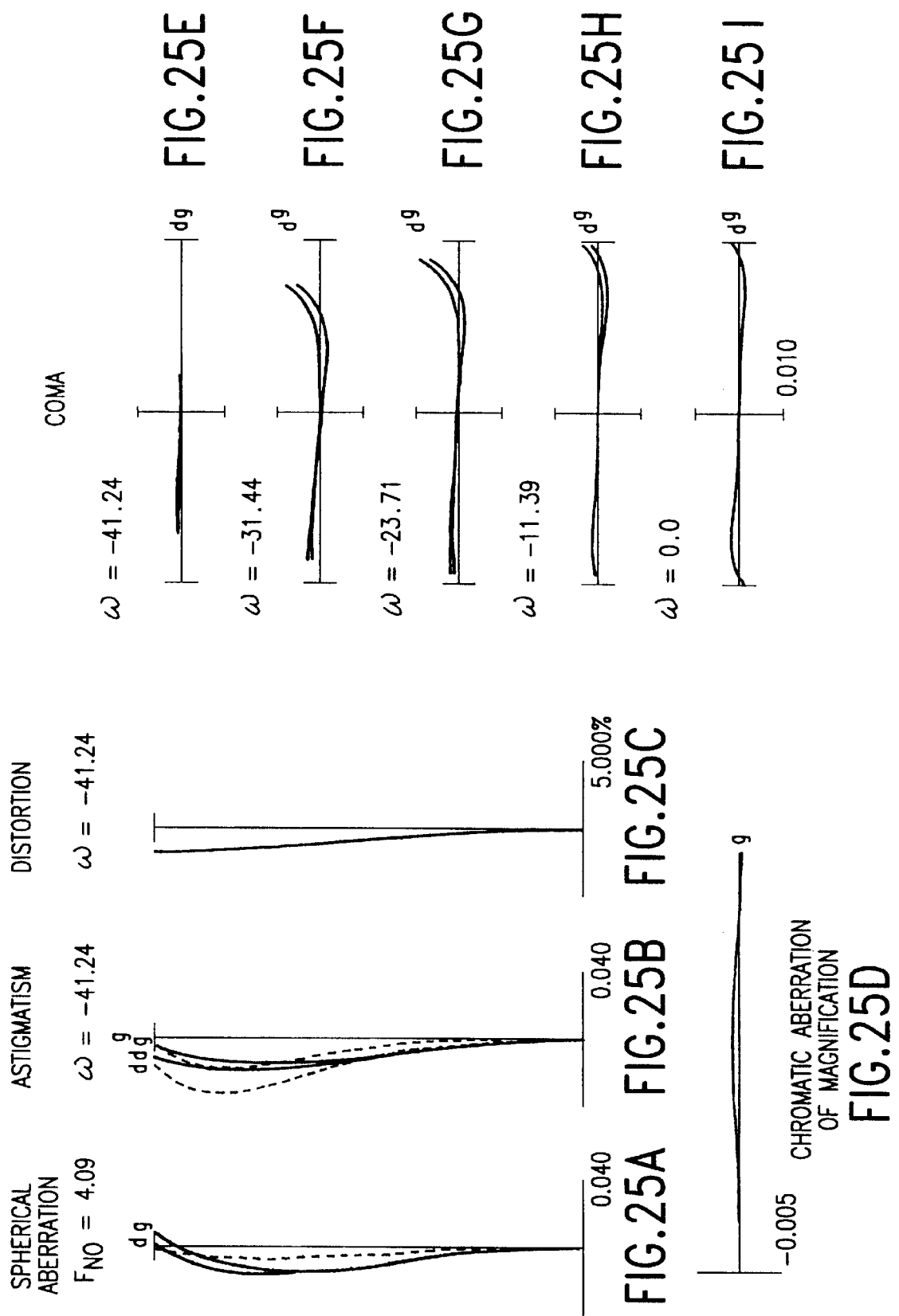
FIGS. 25A–I show various aberrations of the fifth embodiment at an intermediate distance during an infinite focus state.
Figure 26:
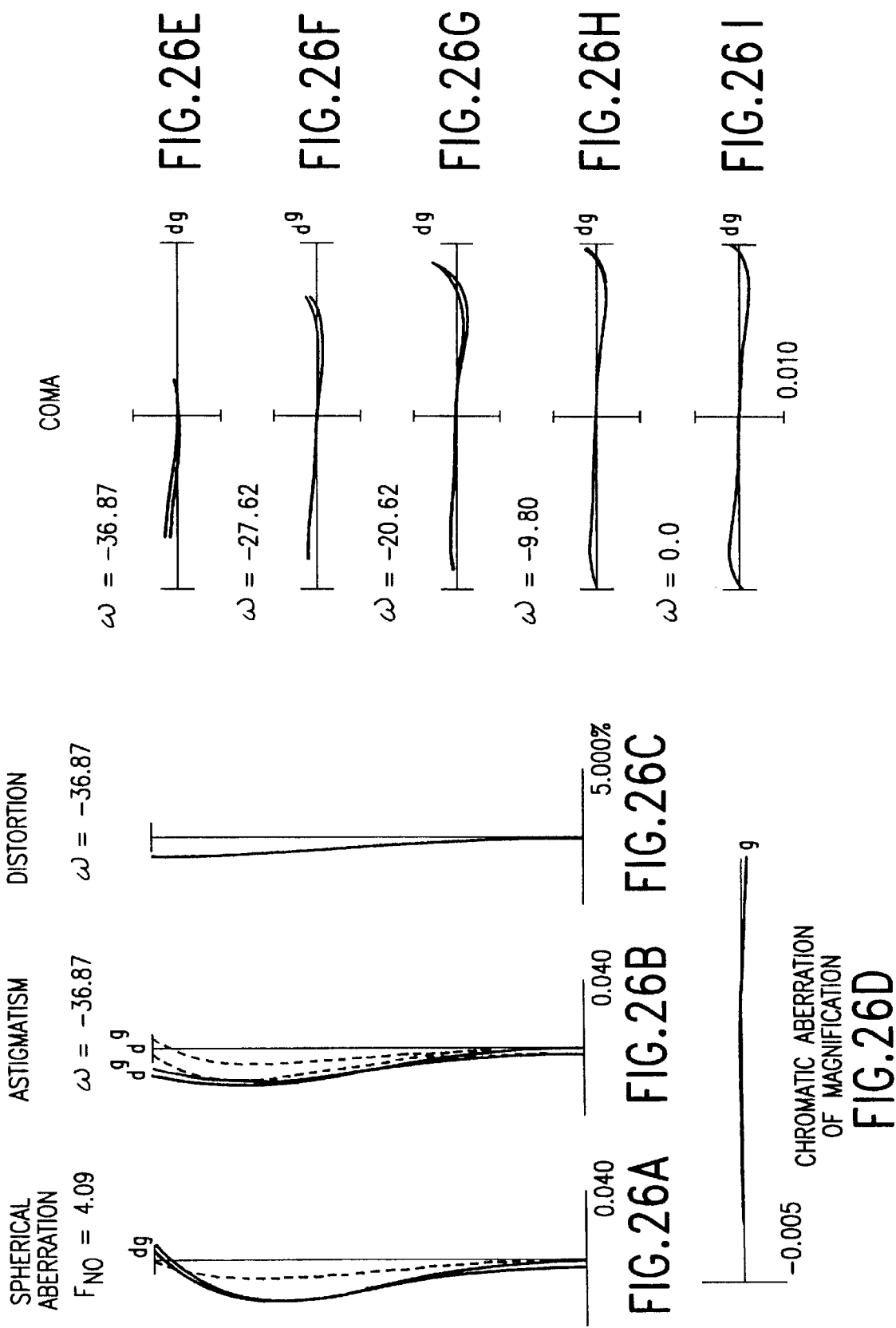
FIGS. 26A–I show various aberrations of the fifth embodiment at a maximum telephoto state during an infinite focus state.
Figure 27:
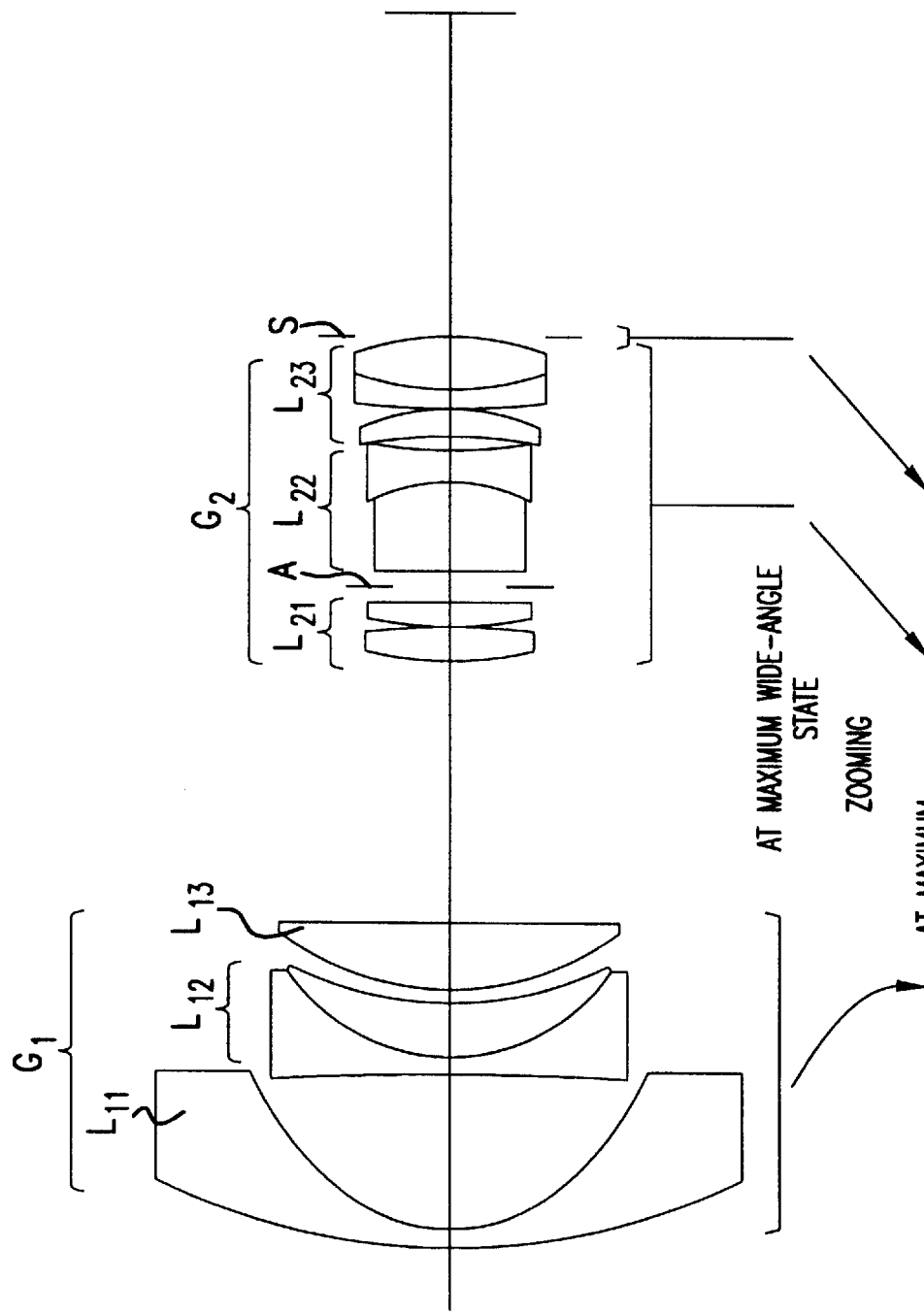
FIG. 27 is a lens structure of a sixth embodiment of the invention.
Figure 28:
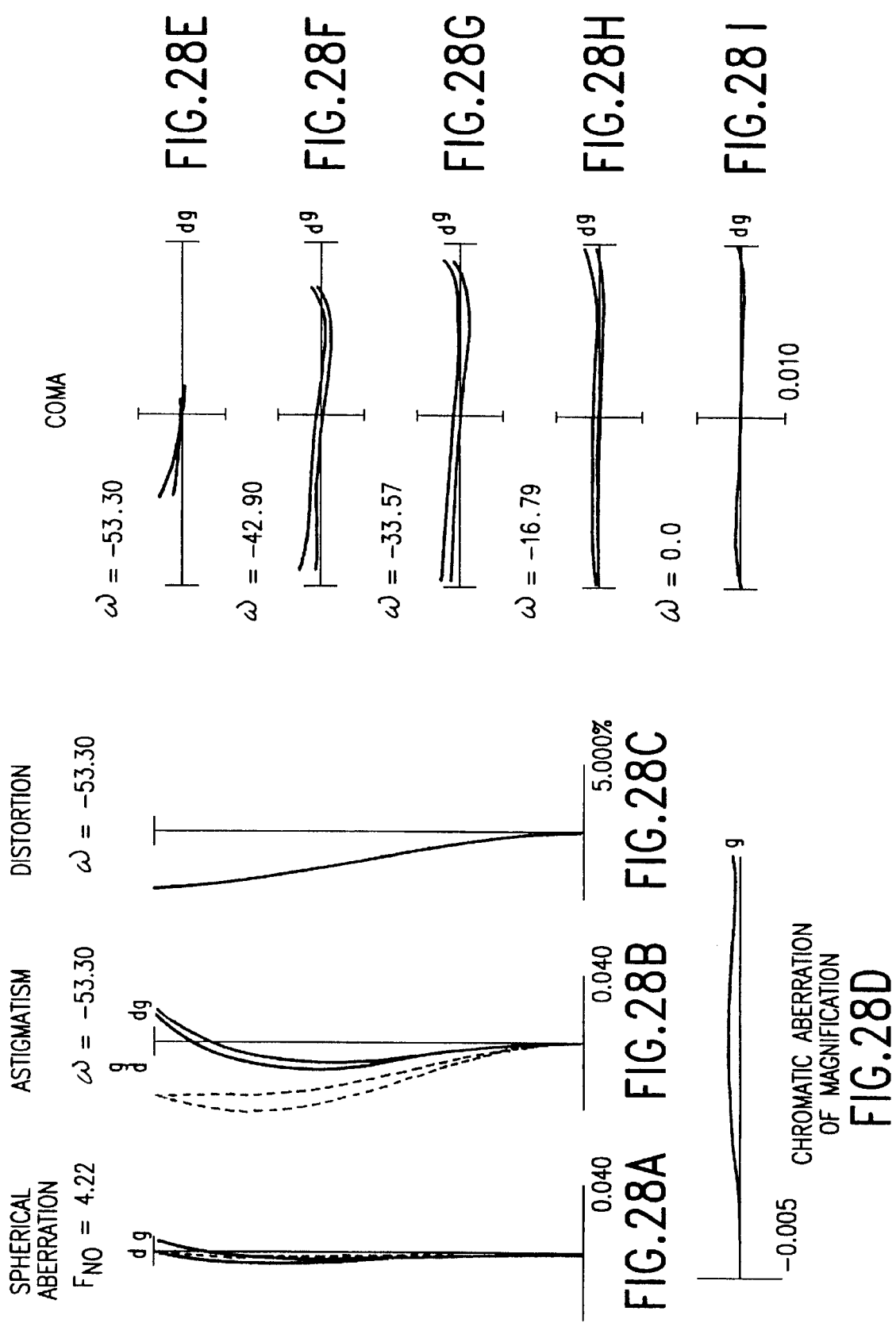
FIGS. 28A–I show various aberrations of the sixth embodiment at a maximum wide-angle state during an infinite focus state.
Figure 29:
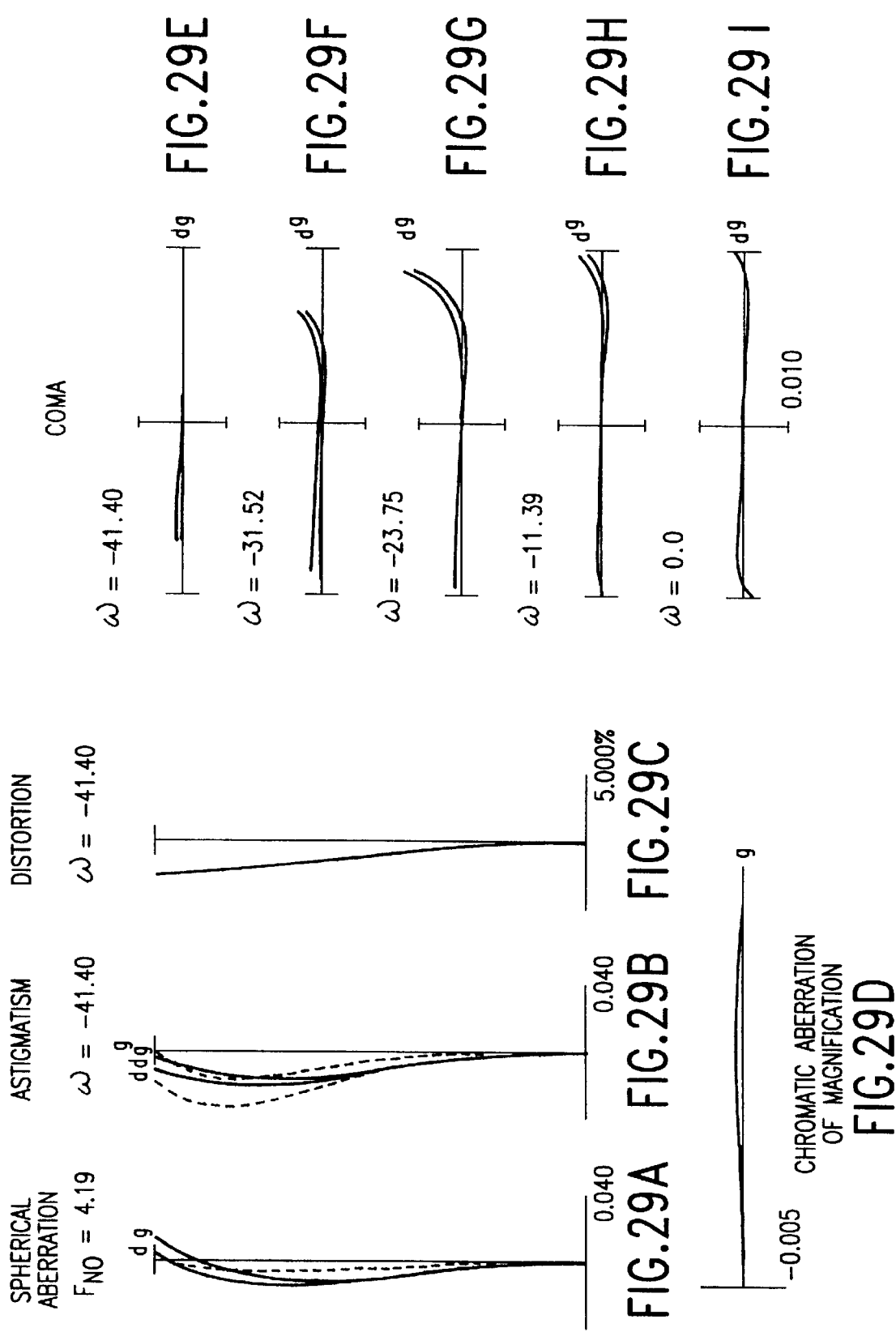
FIGS. 29A–I show various aberrations of the sixth embodiment at an intermediate distance during an infinite focus state.
Figure 30:
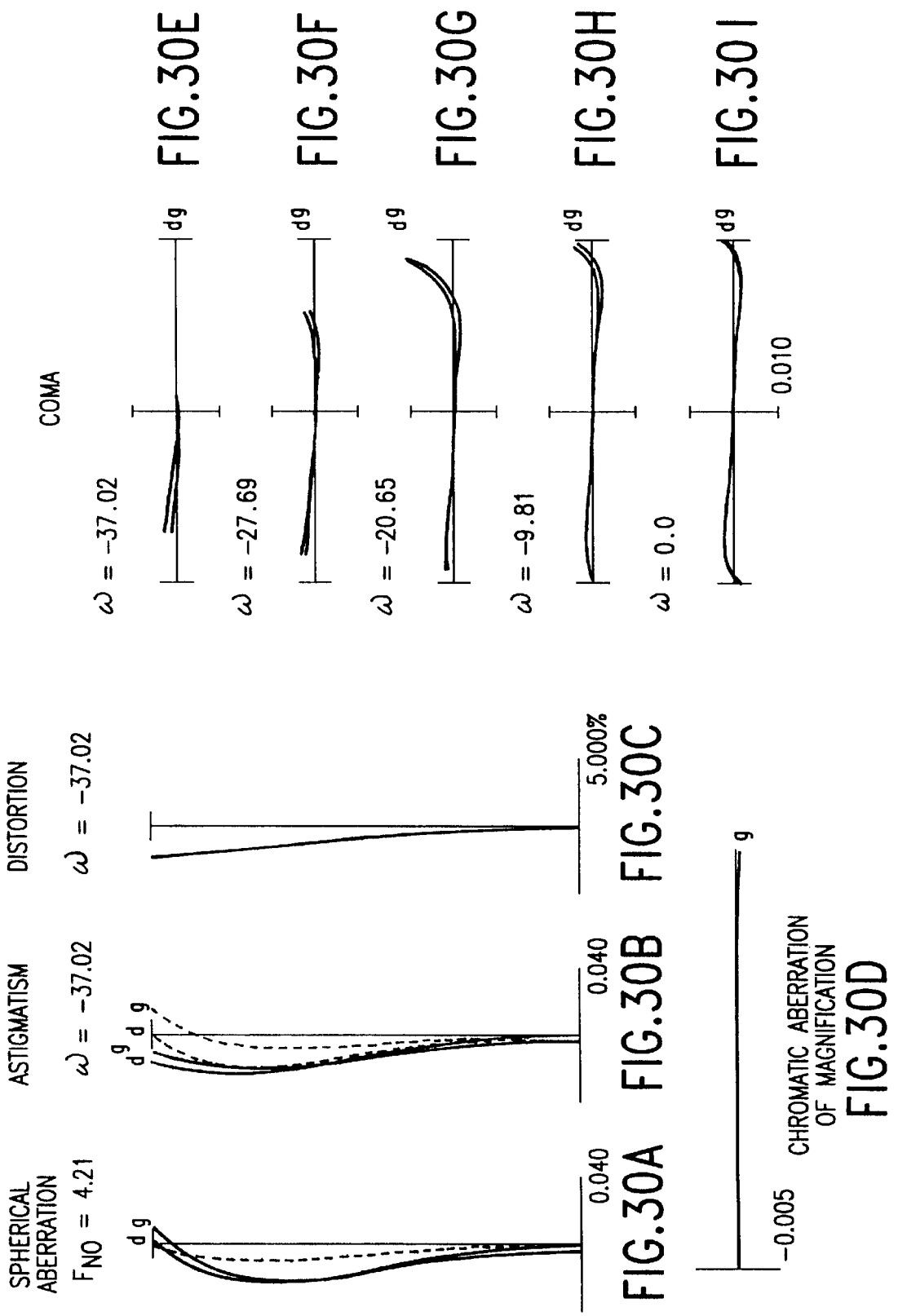
FIGS. 30A–I show various aberrations of the sixth embodiment at a maximum telephoto state during an infinite focus state.
Figure 31:
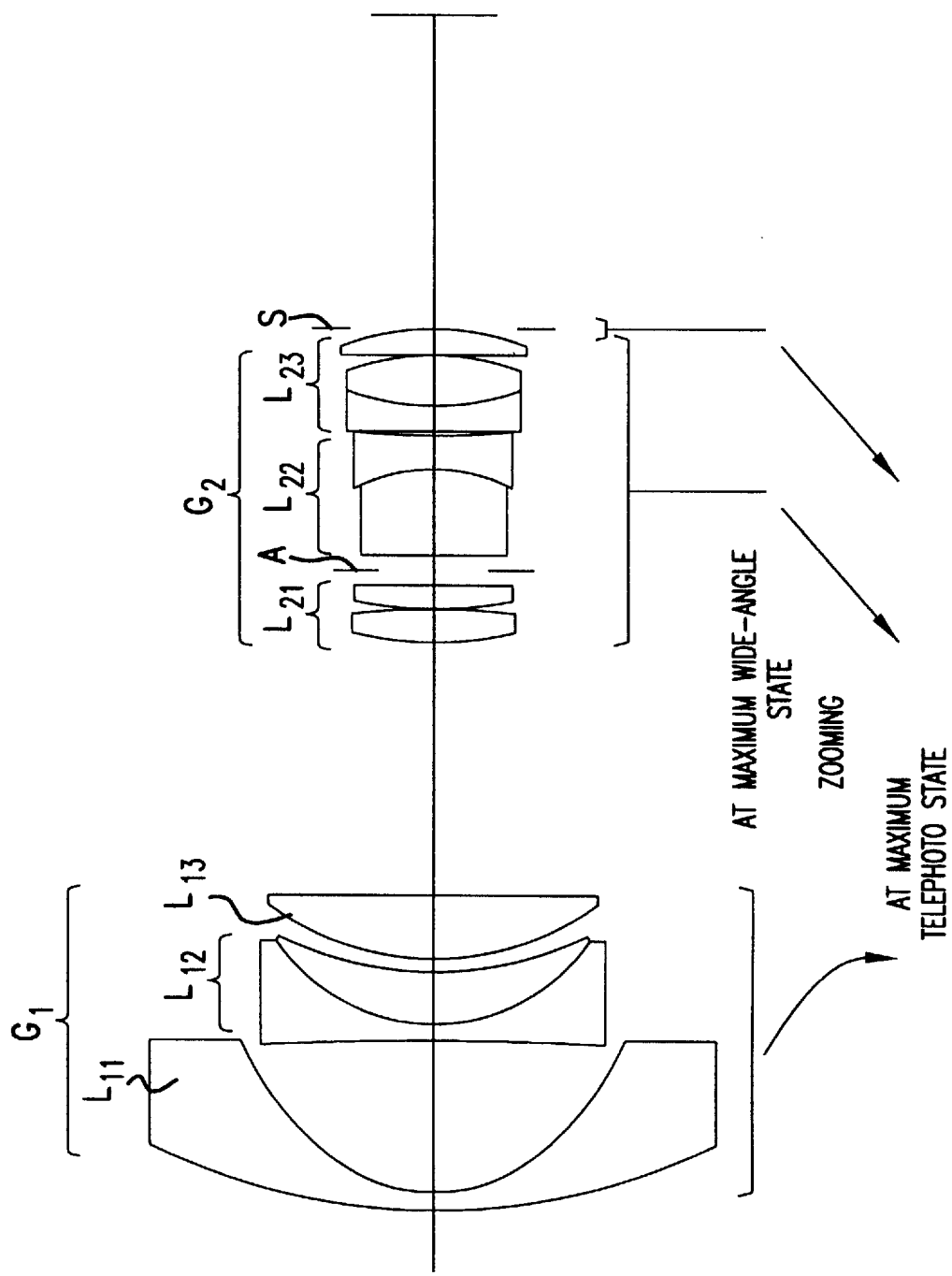
FIG. 31 is a lens structure of a seventh embodiment of the invention.
Figure 32:
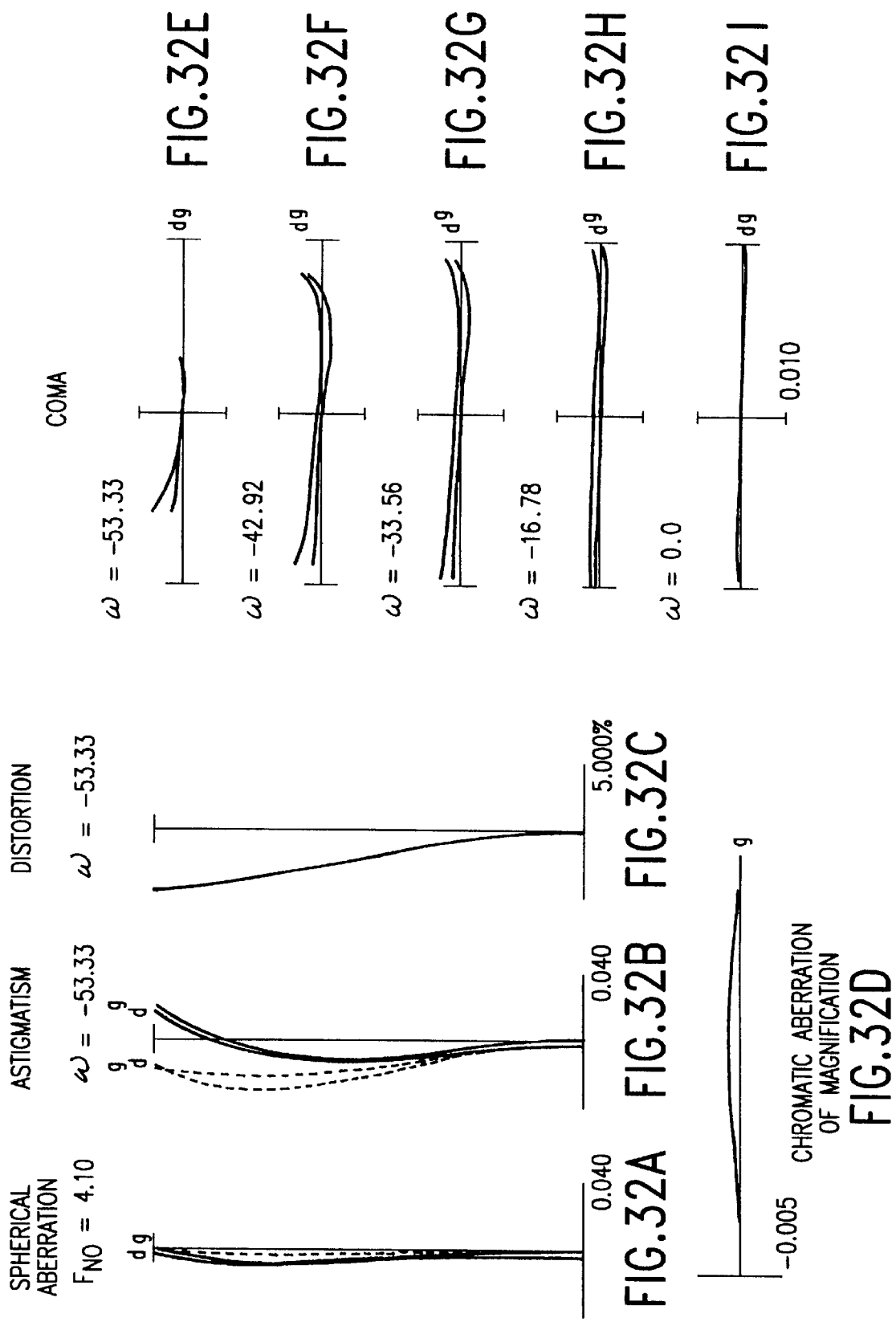
FIGS. 32A–I show various aberrations of the seventh embodiment at a maximum wide-angle state during an infinite focus state.
Figure 33:
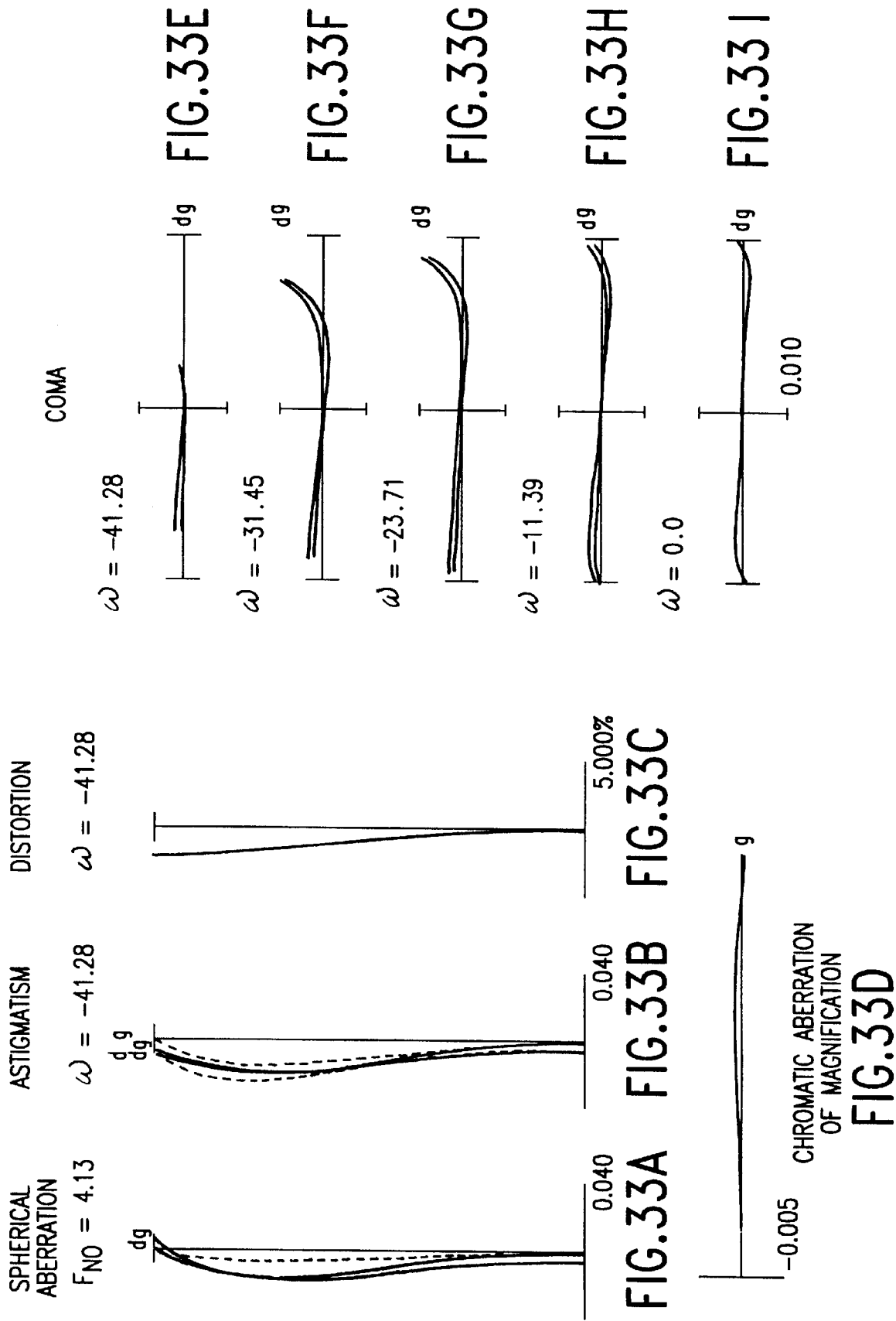
FIGS. 33A–I show various aberrations of the seventh embodiment at an intermediate distance during an infinite focus state.
Figure 34:
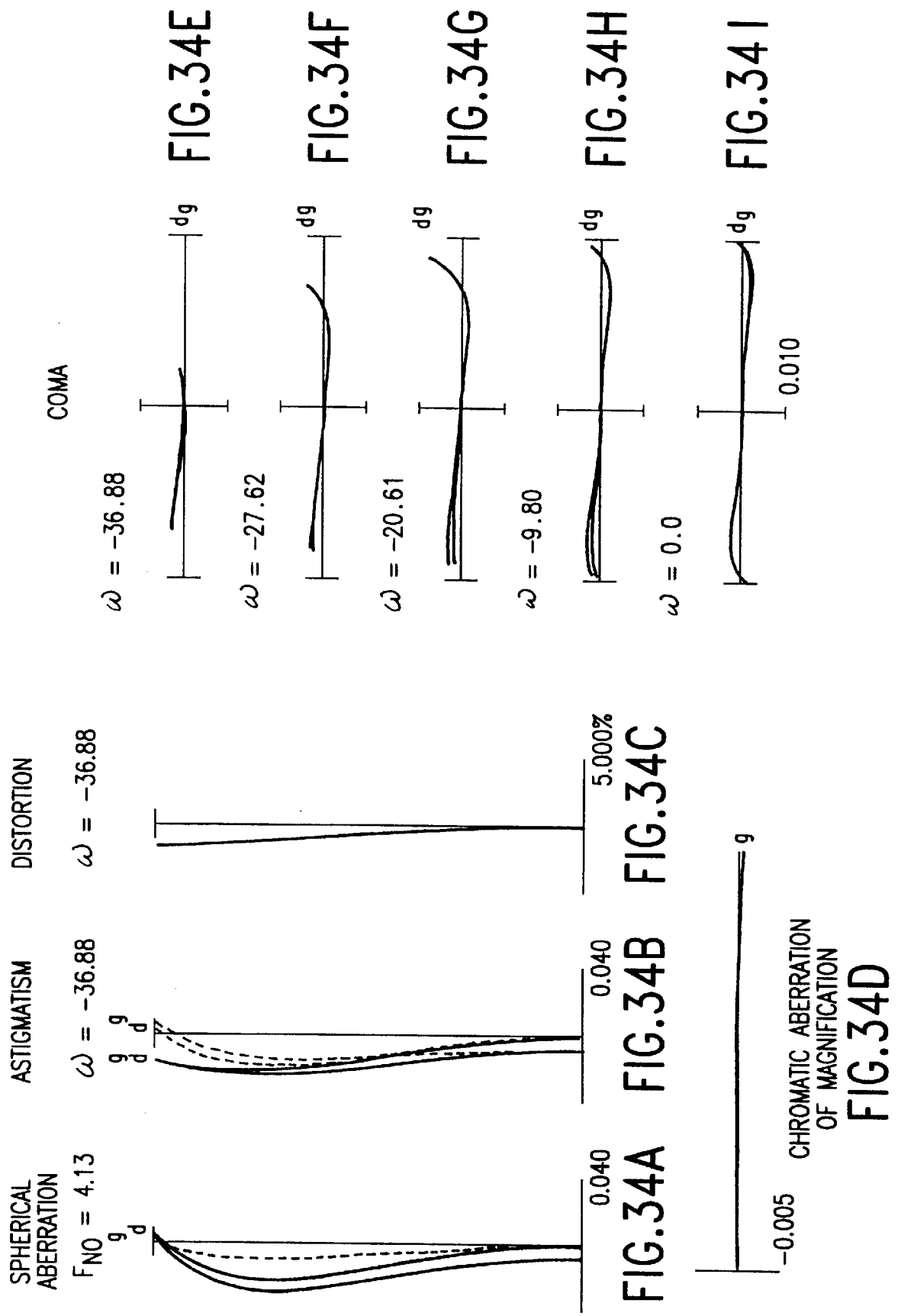
FIGS. 34A–I show various aberrations of the seventh embodiment at a maximum telephoto state during an infinite focus state.

Hereafter, specific configurations of the present invention will be described. FIG. 1 and FIG. 8 describe first and second embodiments of wide angle zoom lenses of the present invention. Each embodiment is a wide angle lens comprising, in the following order from the object side, a first lens group G1 with a negative refractive power, and a second lens group G2 with a positive refractive power, wherein zooming is executed by changing dead space between lens groups G1 and G2. The first lens group G1 comprises, in the following order from the object side, a first front subgroup $G_{1F}$ and a second rear subgroup $G_{1R}$, which contains at least one set of a color erasable negative component $L_n$, and a positive component $L_p$ and which has either a positive refractive power or a negative refractive power. In this wide angle zoom lens, focusing is executed by moving only the first lens group front group $G_{1F}$.

In the present invention, the zoom lens preferably satisfies conditional formula, $$0.3 \leq f_{1F}/f_1 \leq 1 \quad (1)$$

where $f_1$ is the focal length of the first lens group G1 at the maximum wide-angle state during infinite focus state and $f_{1F}$ is the focal length of the first lens group front group $G_{1F}$.

Conditional formula (1) defines the ratio of refractive power of the first lens group front group $G_{1F}$ to the first lens group G1.

Basically, the near distance aberration fluctuation such as astigmatism and lower coma tends to be proportional to the movement amount of the focusing groups. Moreover, the increase in the movement amount of the focusing group causes the main light of the off-axis light rays to move further away from the optical axis, resulting in an increase in the diameter of the frontmost lens and a decrease in the amount of light in the marginal zone. Hence, it is desirable to provide relatively strong refractive power in the focusing group. However, in the case of the common frontmost lens play that focuses with the entire first lens group G1, making the refractive power of the first lens group G1 extremely strong, there is deterioration of the performance of the total lens system other than the near distance performance, which is undesirable.

In general, a first lens group of a negative preceding type zoom lens is preferably arranged with a so-called retro-focus type power arrangement structure comprising, in the following order from the object side, a negative lens component and a positive lens component. In the present invention, near distance performance and favorable amount of light in the marginal zone is maintained by forming a negative lens component or a part of the negative lens component closer to the object side into a focusing group, without deteriorating performance other than near distance performance, strengthening refractive power of the focusing group to minimize the movement amount of the focusing group. However, if the refractive power of the focusing group is too strong, aberration fluctuation tends to increase instead. Hence, a proper range needs to be established.

If $f_{1F}/f_1$ is larger than the upper limit value of conditional formula (1), the refractive power of the first lens group front group $G_{1F}$ becomes smaller than the refractive power of the entire first lens group G1, and above-mentioned effect is no longer obtained. Hence, in the case of a zoom lens with a large field angle like the present invention, focusing by the play of the entire first lens group G1 ends up to be a smaller movement amount, which makes a focusing system like the present invention meaningless.

On the other hand, if $f_{1F}/f_1$ is smaller than the lower limit value of conditional formula (1), the refractive power of the first lens group front group $G_{1F}$ becomes too strong, and the fluctuation of astigmatism and lower coma due to focusing becomes too large as described above. In addition, a problem of performance deterioration occurs due to mechanical precision, such as eccentricity, which is undesirable. Here, if the lower limit value of the conditional formula (1) is changed to 0.5, the aberration fluctuation is desirably more stabilized. If it is further changed to 0.65, the manufacturing of the lens becomes desirably easier.

Moreover, in the present invention, conditional formula, $$5.0 < v_n - v_p \quad (2)$$

is preferably satisfied where $v_n$ is the Abbe number of the negative lens component $L_n$ in the first lens group rear group $G_{1R}$ and $v_p$ is the Abbe number of the positive lens component $L_p$ in the first lens group rear group $G_{1R}$.

Conditional formula (2) defines a condition regarding dispersion difference between glass used for the negative lens component $L_n$ and glass used for the positive lens component $L_p$ in the first lens group rear group $G_{1R}$.

In the present invention, the first lens group rear group $G_{1R}$ basically plays a role of correcting chromatic aberration of magnification and coma at the wide angle side, and off-axis chromatic aberration, spherical aberration, and coma at the telephoto side. This requires a sufficient index of refraction and a dispersion difference when a lens has a strong refractive power as is in the case of a normal negative preceding type zoom lens. Hence, if conditional formula (2) is not satisfied, the correction of chromatic aberration of magnification at the maximum wide-angle state and on-axis chromatic aberration at the maximum telephoto state deteriorates undesirably. Here, by changing the lower limit value of the conditional formula (2) to 10, a more balanced color elimination becomes possible.

Here, when the negative lens component $L_n$ and the positive lens component $L_p$ comprise a plurality of lenses that are either cemented or separated, sufficient color elimination is possible and the provided dispersion difference of an arbitrary lens in $L_n$ or $L_p$ is sufficient. Hence, it is sufficient that conditional formula (2) be met by either the negative lens component $L_n$ or the positive lens component $L_p$ of the first lens group rear group $G_{1R}$.

Moreover, in the present invention, the negative lens component $L_n$ of the first lens group rear group $G_{1R}$ is preferably arranged closer to the object side than the positive lens component $L_p$ of the first lens group rear group $G_{1R}$.

Moreover, one cemented lens is preferably arranged in the first lens group rear group $G_{1R}$. The index of refraction of the glass used for the negative lens component in the cemented lens is preferably larger than the index of refraction of the glass used for the positive component.

Furthermore, out of all the lens surfaces in the first lens group front group $G_{1F}$, at least one surface is preferably made into an aspherical shape. Such a structure is effective in the well balanced correction of distortion, astigmatism and lower coma on the wide angle side during the infinite focus state as well as in controlling the near distance fluctuation of astigmatism and lower coma.

By designing an aspherical surface utilizing a conical coefficient κ for the aspherical surface, correction of finer aberration becomes possible including higher order aberration, just like or even better than controlling aspherical terms of order greater than or equal to 10. As a result, in the first lens group G1, the degree of freedom of aberration correction at the telephoto side increases and a more balanced aberration correction becomes possible even when the aspherical surface is introduced relatively close to the object side.

Moreover, in the present invention, conditional formula, $$1 \leq |f_1|/f_w \leq 2.5 \tag{3}$$

is preferably satisfied where $f_w$ is the focal length of the total lens system at the maximum wide-angle state.

Conditional formula (3) defines a condition for the refractive power of the first lens group G1. If $|f_1|/f_w$ is larger than the upper limit value of conditional formula (3), the refractive power weakens, movement due to zooming of the first lens group G1 increases, and the total lens system becomes large. Moreover, the diameter of the frontmost lens becomes large, causing the diameter of a filter to become undesirably large. Here, changing of the upper limit value of conditional formula (3) to 2.0 enables further miniaturization.

On the other hand, if $|f_1|/f_w$ is smaller than the lower limit value of the conditional formula (3), the refractive power of the first lens group G1 becomes extremely strong and correction of distortion, astigmatism and chromatic aberration of magnification becomes undesirably difficult in the case of a zoom lens having a large field angle like the present invention. Here, changing of the lower limit value to 1.2 results in the further improvement of performance, which is desirable.

Furthermore, in the present invention, the second lens group G2 preferably comprises a positive-negative-positive lens component from the object side. The power arrangement of so-called triplet structure secures the dead space between the first and the second groups and has a sufficiently large aperture, and enables balanced correction of each aberration in the case of a zoom lens in the present invention.

To be more specific, by making the second lens group G2 comprise, in the following order from the object side, a positive lens component, a positive lens component, a cemented negative lens component, cemented positive lens component, and positive lens component, an advantageous condition is achieved for the correction of various aberrations and for setting the appropriate Petzval sum.

Moreover, in the present invention, conditional formula, $$1.6 < f_2/f_w < 3.0 \tag{4}$$

is preferably satisfied where $f_2$ is the focal length of the second lens group G2.

Conditional formula (4) defines a condition that regulates the focal length $f_2$ of the second lens group G2 in an appropriate range. If $f_2/f_w$ is smaller than the lower limit value of conditional formula (4), the refractive power of the second lens group G2 becomes extremely strong, causing drastic worsening of the spherical aberration at the maximum telephoto state and an increase in the fluctuation of spherical aberrations due to zooming, which is not desirable, though a change in the total length of the lens system becomes small.

Moreover, in order to maintain a favorable balance with other aberrations while correcting the spherical aberration, the number of lenses in the second lens group G2 needs to be increased, which results in undesirable weakening of the effect of miniaturization through the use of thick lenses. Here, effect of the present invention may be made stronger and correction of spherical aberration and upper coma is made even better by changing the lower limit value of conditional formula to 1.8 or even to 2.0.

On the other hand, if $f_2/f_w$ is larger than the upper limit value of conditional formula (4), the refractive power of the second lens group G2 becomes weak and a value of the back focus of the lens system becomes extremely large, causing the length of the total lens system to become too long to be a compact system. In addition, fluctuation of the length of the total lens system becomes too large, resulting in an undesirably large system. Here, the effect of the present invention may be strengthened, and a compact and inexpensive zoom lens having small fluctuation of the length of the total lens system is achieved by changing the upper limit value of conditional formula (4) to 2.8 or even 2.6.

Moreover, the present invention, conditional formula, $$2 < BF_w/f_w \tag{5}$$

is preferably satisfied where $BF_w$ is a back focus at the maximum wide-angle state.

Conditional formula (5) provides an arrangement of optical devices such as a quick return mirror, a prism and a filter towards the back of the lens system possible by properly establishing each element, such as refractive powers and principal points space, of the first lens group G1 and the second lens group G2 so that the length $BF_w$ of back focus at the maximum wide-angle state is more than double the focal length $f_w$ at the maximum wide-angle state. Hence, if $BF_w/f_w$ is smaller than the lower limit value of conditional formula (5), interference with optical devices such as mirror occurs in the case of a single lens reflex camera, resulting in an unusable system.

In the present invention, by making the front subgroup $G_{1F}$ with a cemented lens or a set of a negative lens and a positive lens both having combined negative refractive power, a compact and excellent zoom lens having a filter with a small diameter is obtained. Moreover, by making the front subgroup $G_{1F}$ with one lens having an aspherical surface, resulting in the smallest and the lightest focusing group, a zoom lens which is even more compact and easy to manufacture is obtained.

The following Tables 1–5 list the dimensions according to each embodiment. In the [Total System Dimension] of each Table, f is the focal length of the total system, $F_{NO}$ is the F-number, and 2ω is a field angle. In [Lens Dimension], the first column is the lens surface number assigned in the following order from the object side, the second column r is the radius of curvature of each lens surface, the third column d is space between each lens surface, the fourth column $v_d$ is the Abbe number of each lens relative to d-line (λ=587.6 nm), and the fifth column $n_d$ is the index of refraction of each lens relative to d-line. Moreover, the asterisk in the first column indicates that the lens surface is aspherical.

The aspherical shape is expressed by, $$S(y) = \frac{y^2/R}{1 + \sqrt{1 - \kappa y^2/R^2}} + \sum_{i=2}^{N} C_{2i} y^{2i} \quad (N \geq 2)$$

where, y is the height in the direction perpendicular to the optical axis,

S(y) is the displacement amount at height y in the direction of the optical axis, R is the radius of curvature on the optical axis, κ is a conical coefficient, and $C_n$ is the aspherical coefficient of order n, and conical coefficient κ and aspherical surface coefficient $C_n$ are shown in [Aspherical Surface Data].

Moreover, in [Focusing Data], f/β is either the focal length f or the magnification β and $d_0$ is the object distance.

Furthermore, Table 3 below lists the value of parameters in each of conditional formula (1)–(5) for both embodiments.

As previously described, in applying conditional formula (2), only one of the negative lens components $L_n$ and only one of the positive lens components $L_p$ in the rear subgroup $G_{1R}$ need to satisfy conditional formula (2). The rear subgroup $G_{1R}$ of the first embodiment has two positive lens components $L_p$ and the value based on the positive lens component $L_p$ closest to the image side is listed in Table 3. Moreover, the rear subgroup $G_{1R}$ of the second embodiment has two negative lens components $L_n$ and two positive lens components $L_p$, and the values based on the negative lens component $L_n$ closest to the image side and the positive lens component $L_p$ closest to the image side are listed in Table 3.

TABLE 1

Total System Dimension
f = 1.0~1.7388    $F_{NO}$ = 4.1
2ω = 107°~73.86°
Lens Dimension

| No. | r | d | $v_d$ | $n_d$ |
|---|---|---|---|---|
| 1 | 4.8648 | 0.1269 | 40.90 | 1.796310 |
| *2 | 0.9283 | $d_2$ | | |
| 3 | -2159.1581 | 0.1194 | 45.37 | 1.796681 |
| 4 | 1.3396 | 0.3731 | 58.90 | 1.518230 |
| 5 | 2.6202 | 0.0455 | | |
| 6 | 2.0352 | 0.4104 | 25.50 | 1.804581 |
| 7 | -47.4379 | $d_7$ | | |
| 8 | 1.6846 | 0.2090 | 61.09 | 1.589130 |
| 9 | -26.3986 | 0.0075 | | |
| 10 | 2.5164 | 0.1642 | 61.09 | 1.589130 |
| 11 | 9.0428 | 0.1119 | | |
| 12 | — | 0.1119 | (aperture stop) | |
| 13 | 10.0147 | 0.5970 | 64.10 | 1.516800 |
| 14 | -0.8765 | 0.2537 | 40.90 | 1.796310 |
| 15 | 6.2563 | 0.0373 | | |
| 16 | -9.2450 | 0.1306 | 33.89 | 1.803840 |
| 17 | 1.2903 | 0.3731 | 70.41 | 1.487490 |
| 18 | -1.4625 | 0.0075 | | |
| 19 | -243.0795 | 0.1642 | 61.09 | 1.589130 |
| 20 | -1.9770 | $d_{20}$ | | |
| 21 | — | $d_{21}$ | (flare stopper) | |

Aspherical Surface Data

NO = 2   κ = 0.1144   $C_4$ = 3.72800 × 10⁻²
                      $C_6$ = 1.83730 × 10⁻³
                      $C_8$ = 1.06640 × 10⁻²
                      $C_{10}$ = -7.66140 × 10⁻⁴

Focusing

| | Position 1 | Position 2 | Position 3 | Position 4 | Position 5 |
|---|---|---|---|---|---|
| f/β | 1.00000 | 1.49254 | 1.73881 | -0.03333 | -0.03333 |
| $d_0$ | ∞ | ∞ | ∞ | 28.0434 | 42.8170 |
| $d_2$ | 1.05048 | 1.05048 | 1.05048 | 1.12169 | 1.09819 |
| $d_7$ | 1.74511 | 0.44748 | 0.07435 | 1.74511 | 0.44748 |
| $d_{20}$ | -0.02238 | 0.12120 | 0.27045 | -0.02238 | 0.12120 |
| $d_{21}$ | 2.23812 | 2.76491 | 2.95083 | 2.23857 | 2.76537 |

| | Position 6 | Position 7 | Position 8 | Position 9 |
|---|---|---|---|---|
| f/β | -0.03333 | -0.10000 | -0.10000 | -0.10000 |
| $d_0$ | 50.2051 | 8.0404 | 12.9658 | 15.4284 |
| $d_2$ | 1.09144 | 1.26412 | 1.19362 | 1.17335 |
| $d_7$ | 0.07435 | 1.74511 | 0.44748 | 0.07435 |
| $d_{20}$ | 0.27045 | -0.02238 | 0.12120 | 0.27045 |
| $d_{21}$ | 2.95128 | 2.24240 | 2.76912 | 2.95502 |

TABLE 2

Total System Dimension
f = 1.0~1.7388    $F_{NO}$ = 3.6~5.78
2ω = 107°~73.86°
Lens Dimension

| No. | r | d | $v_d$ | $n_d$ |
|---|---|---|---|---|
| 1 | 5.6625 | 0.1269 | 39.82 | 1.869940 |
| *2 | 1.1067 | $d_2$ | | |
| 3 | 3.2902 | 0.1343 | 40.90 | 1.796310 |
| 4 | 1.8964 | 0.2239 | | |
| 5 | 5.7001 | 0.1194 | 43.35 | 1.840421 |
| 6 | 1.1584 | 0.4104 | 54.55 | 1.514540 |
| 7 | 2.4099 | 0.0075 | | |
| 8 | 1.7729 | 0.3731 | 25.50 | 1.804581 |
| 9 | -67.6085 | $d_9$ | | |
| 10 | 1.7889 | 0.2239 | 58.90 | 1.518230 |
| 11 | -47.2400 | 0.0075 | | |
| 12 | 1.7702 | 0.1866 | 58.90 | 1.518230 |
| 13 | 7.3044 | 0.1119 | | |
| 14 | — | 0.2598 | (aperture stop) | |
| 15 | 456.5432 | 0.5224 | 54.55 | 1.514540 |
| 16 | -0.8477 | 0.0746 | 40.90 | 1.796310 |
| 17 | 6.4833 | 0.0597 | | |
| 18 | -7.9453 | 0.0746 | 28.56 | 1.795040 |
| 19 | 1.3662 | 0.3731 | 58.90 | 1.518230 |
| 20 | -1.3600 | 0.0075 | | |
| 21 | 8.5095 | 0.1716 | 58.90 | 1.518230 |
| 22 | -2.0169 | $d_{22}$ | | |
| 23 | — | $d_{23}$ | (flare stopper) | |

Aspherical Surface Data

NO = 2   κ = 0.1147   $C_4$ = 2.29690 × 10⁻²
                      $C_6$ = 3.77810 × 10⁻³
                      $C_8$ = -4.54880 × 10⁻³
                      $C_{10}$ = 3.97830 × 10⁻⁴

Focusing Data

| | Position 1 | Position 2 | Position 3 | Position 4 | Position 5 |
|---|---|---|---|---|---|
| f/β | 1.00000 | 1.49254 | 1.73881 | -0.03333 | -0.03333 |
| $d_0$ | ∞ | ∞ | ∞ | 27.9031 | 42.6792 |
| $d_2$ | 0.68895 | 0.68895 | 0.68895 | 0.77448 | 0.74626 |
| $d_9$ | 1.66598 | 0.42740 | 0.07124 | 1.66598 | 0.42740 |
| $d_{22}$ | -0.01492 | 0.22388 | 0.37314 | -0.01492 | 0.22388 |
| $d_{23}$ | 2.31671 | 2.79496 | 2.95922 | 2.31718 | 2.76542 |

-continued

|  | Position 6 | Position 7 | Position 8 | Position 9 |
|---|---|---|---|---|
| f/β | −0.03333 | −0.10000 | −0.10000 | −0.10000 |
| $d_0$ | 50.0672 | 7.9031 | 12.8284 | 15.2911 |
| $d_2$ | 0.73814 | 0.94556 | 0.86088 | 0.83653 |
| $d_9$ | 0.07124 | 1.66598 | 0.42740 | 0.07124 |
| $d_{22}$ | 0.37314 | −0.01492 | 0.22388 | 0.37314 |
| $d_{23}$ | 2.95969 | 2.32100 | 2.76918 | 2.96343 |

TABLE 3

| | Embodiment No. | |
|---|---|---|
| | 1 | 2 |
| (1) $f_{1F}/f_1$ | 0.860 | 0.977 |
| (2) $v_n < v_p$ | 19.9 | 15.4 |
| (3) $|f_1|/f_w$ | 1.70 | 1.64 |
| (4) $f_2/f_w$ | 2.313 | 2.288 |
| (5) $BF_w/f_w$ | 2.238 | 2.317 |

FIGS. 2A–I, FIGS. 3A–I and FIGS. 4A–I describe spherical aberration, astigmatism, distortion, coma and chromatic aberration of magnification at a maximum wide-angle state, at an intermediate distance and at a maximum telephoto state during an infinite focus state of the first embodiment. Moreover, FIGS. 5A–I, FIGS. 6A–I and FIGS. 7A–I describe various aberrations at a maximum wide-angle state, at an intermediate distance and at a maximum telephoto state during a magnification of −1/30. Likewise, FIGS. 9A–I, 10A–I and 11A–I describe various aberrations during an infinite focus state of the second embodiment, and FIGS. 12A–I, 13A–I and 14A–I describe various aberrations during a magnification of −1/30. In the astigmatism diagram, the dotted line describes a sine condition. In the astigmatism diagram, the real line describes sagittal image surface and the dotted line describes a meridional image surface. In each figure, $F_{NO}$ is an F-number and 2ω is a half field angle, NA is the aperture number, and $H_0$ is the incident height relative to a near distance object point.

From each aberration diagram it is clear that the use of an appropriate lens configuration and satisfaction of conditional formulas (1)–(5) results in excellent imaging performance in both embodiments.

As hereto described, the present invention provides a zoom lens which is compact, has simple lens barrel structure for focusing, has excellent near distance performance with small number of lens components, with large field angle.

FIGS. 15, 19, 23, 27 and 31 describe the third through seventh embodiments of super wide angle zoom lenses of the present invention. Each embodiment is a super wide angle lens comprising, in the following order from the object side, a first lens group G1 with a negative refractive power, and a second lens group G2 with a positive refractive power, wherein zooming is executed by changing dead space between lens groups G1 and G2. The first lens group G1 comprises, in the following order from the object side, a first subgroup L11 having a negative refractive power formed in a meniscus shape with a concave surface facing the image side, a second subgroup L12 with a negative refractive power having a cemented negative lens with at least a negative lens and a positive lens cemented, and a third subgroup L13 having a positive refractive power with a convex side facing the object side.

The second lens group G2 comprises, in the following order from the object side, a first subgroup L21 having a positive refractive power with at least one convex lens, a second subgroup L22 with a negative refractive power having a cemented negative lens with at least a positive lens and a negative lens cemented, and a third subgroup L23 with a positive refractive power having a cemented positive lens with at least a negative lens and a positive lens cemented. Moreover, at least one of the lens surfaces among all the lens surfaces of the first subgroup L11 and the second subgroup L12 is formed in an aspherical shape.

Additionally, the following conditional formulas are satisfied, $$1.0 < |f1|/fw < 2.0 \tag{6}$$

$$1.5 < f2/fw < 3.5 \tag{7}$$

$$0.5 < |f11|/fw < 4 \tag{8}$$

where, f1 is the focal length of the first lens group G1,
f2 is the focal length of the second lens group G2,
fw is the focal length of the total lens system at a maximum wide-angle state, and
f11 is the focal length of the first lens group first lens subgroup component L11.

First, a lens structure of the first lens group G1 in the present invention will be described. The first lens group G1 is basically a 3-group structure comprising in the following order from the object side, a first subgroup L11 having a negative refractive power formed in a meniscus shape, a second subgroup L12, and a third subgroup L13 having a positive refractive power. The first subgroup L11 has a strong refractive power. The first lens group is effective for making the diameter of the front lens small and for making the entire system compact. Moreover, the first subgroup L11 is structured in such a manner that the positive lens, independent from the positive lens component made of cementing, is not placed closest to the object side. This makes the system compact and makes the radius of the lens small because the closer a positive component is placed to the object side, the larger and more impractical becomes the entire lens system. Moreover, it is desirable to introduce an aspherical surface to the first subgroup L11 to correct distortion, astigmatism and coma. Hence, it is desirable to make the refractive surface that is closer to the object side, or which is the image side surface of the negative lens closer to the object side, the aspherical surface. In each embodiment of the present invention, as the most effective example, an aspherical surface is placed on the image side surface of the negative meniscus lens that is closest to the object side.

Moreover, the second subgroup L12 of first lens group G1 comprises a cemented negative lens assembly including cementing of a negative lens and a positive lens in this order from the object side. Having a negative lens on the object side is effective in making the diameter of the front lens small, in securing the dead space between the first lens group G1 and the second lens group G2, and in controlling chromatic aberration of higher order magnification. Furthermore, it is desirable to have the total shape of the cemented negative lens be a meniscus shape with the convex surface facing the object side, and a plane-concave shape of a biconcave shape to further strengthens the above-mentioned effect.

The structure of the second lens group G2 is basically a positive-negative-positive triplet structure. The first subgroup L21 with a positive refractive power comprises at least one positive lens and preferably two positive lenses because placement of two lenses is more favorable for correction of spherical aberration, particularly at the telephoto side. A second subgroup L22 with a negative refractive power comprises a cemented negative lens assembly made of cementing at least one positive lens and a negative lens having biconcave shape in the following order from the object side. It is desirable that the positive lens be made thicker than the negative lens, considering the correction of spherical aberration and upper coma. A third subgroup L23 with a positive refractive power comprises a positive lens assembly made of cementing at least a negative lens and a positive lens having biconvex shape in the following order from the object side in order to correct upper coma and to maintain a favorable Petzval sum.

Next, conditional formula (6) defines a dimensional relationship of the focal length, or magnitude relationship of refractive power of the first lens group G1. If |f1|/fw is larger than the upper limit value of (1), the refractive power of the first lens group G1 weakens and the change in length of the entire lens system becomes undesirably large during zooming, particularly at the maximum wide-angle state. Moreover, not only does the amount of light in the marginal zone decrease but also the amount of play during close shooting increases and near distance fluctuation increases, all of which are undesirable. Even more compact system and more desirable imaging performance is obtained by changing the upper limit value of conditional formula (6) to 1.9 or even to 1.84.

On the other hand, if |f1|/fw is smaller than the lower limit value of conditional formula (6), the refractive power of the first lens group G1 becomes extremely strong. If the zoom lens is small and of relatively simple structure with the field angle more than 100° as is the case of the present invention, distortion, astigmatism and lower coma cannot be corrected satisfactorily even if an aspherical surface is introduced, hence it is not desirable. Even more favorable imaging performance is obtained if the lower limit value of conditional formula (1) is changed to 1.4 or even to 1.55.

Conditional formula (7) defines a dimensional relationship of the focal length, or a magnitude relationship of the refracting power of the second lens group G2. If f2/fw is larger than the upper limit value of conditional formula (7), the refracting power of the second lens group G2 becomes extremely weak and movement amount due to zooming of the second lens group G2 increases, causing the system to become large in order to obtain the zoom ratio of the same amount, and causing the F-number to change drastically. Particularly, the F-number at the telephoto side becomes undesirably dark. Moreover, the back focus becomes too large, causing the system to become even larger. By changing the upper limit value of conditional formula (7) to 3, the system may desirably be made more compact.

On the other hand, if f2/fw is smaller than the lower limit value of conditional formula (7), the refractive power of the second lens group G2 becomes extremely strong, and though the change in the total length of the lens system becomes short, a spherical aberration at the maximum telephoto state worsens drastically and also the fluctuation of spherical aberration due to zooming increases undesirably. Moreover, in order to correct the spherical aberration and at the same time to maintain favorable balance with other aberration, the number of lenses in the second lens group G2 must be increased, which undesirably offsets the effect of making the system smaller by using thinner lenses. Furthermore, in order to further increase the effect of the present invention, the lower limit value of conditional formula (7) may be changed to 2 or even to 2.25, which will result in more favorable correction of spherical aberration and upper coma.

Conditional formula (8) defines a dimensional relationship of the focal length, or a magnitude relationship of the refractive power of the first lens subgroup L11 of the first lens group G1. If |f11|<fw is larger than the upper limit value of conditional formula 3, particularly in the case of a zoom lens having a large field angle, the incident height of the oblique light rays entering the first surface changes to a position further away from the optical axis, resulting in a larger diameter of the frontmost lens and in lack of light amount in the marginal zone, which is not desirable. Even better effect for making the system smaller and more compact may be achieved by changing the upper limit value of conditional formula (8) to 3.2.

On the other hand, if |f11|/fw is smaller than the lower limit value of conditional formula (8), the refractive power of the first subgroup L11 becomes extremely strong and correction of distortion, astigmatism and lower coma, particularly on the side angle side, as well as correction of lower coma and spherical aberration on the telephoto side becomes undesirably difficult. Here, even more favorable correction of aberration may be achieved by changing the lower limit value of conditional formula (8) to 1.

In the present invention, each of the following conditional formulas is preferably satisfied;

$$0.05 < n_{12n} - n_{12p} < 0.4 \qquad (9)$$

$$v_{12n} < v_{12p} \qquad (10)$$

where, $n_{12n}$ is the index of refraction of the negative lens in the cemented negative lens assembly in the second subgroup L12 relative to d-line, $n_{12p}$ is the index of refraction of the positive lens in the cemented negative lens assembly in the second subgroup L12 relative to d-line, $v_{12n}$ is the Abbe number of the negative lens in the cemented negative lens assembly in the second subgroup L12, and $v_{12p}$ is the Abbe number of the positive lens in the cemented negative lens assembly in the second subgroup L12.

Conditional formula (9) defines a difference between the index of refraction of the negative lens $n_{12n}$ and the index of refraction of the positive lens $n_{12p}$ in the cemented negative lens of the second subgroup L12. In the case of a zoom lens having large field angle like the present invention, correction of off-axis aberration, particularly distortion, surface bowing and astigmatism is important, which can safely be said to affect imaging performance of the total lens system. Particularly, the Petzval sum is an important parameter for surface bowing and sufficient difference is needed between the indices of refraction of the negative lens and the positive lens. Particularly, cementing of the negative and the positive lenses has the effect of maintaining favorable Petzval sum. Moreover, placing of the cemented lens in the first lens group G1 results in effective correction of off-axis aberration in addition to maintaining favorable Petzval sum.

If $n_{12n}-n_{12p}$ is larger than the upper limit value of conditional formula (9), the material used for the negative lens among optical glass currently usable tends to drastically decrease the transmission rate of the short wavelength light, causing an undesirable ill effect on the color balance of the total lens system. An even better effect may be achieved by changing the upper limit value of conditional formula (9) to 0.35.

On the other hand, if $n_{12n}-n_{12p}$ is smaller than the lower limit value of conditional formula (4), the Petzval sum becomes undesirably too small to correct astigmatism and surface bowing. Even better imaging performance may be achieved by changing the lower limit value of conditional formula (9) to 0.1.

Conditional formula (10) defines a magnitude relationship between the Abbe number of the negative lens $v_{12n}$ and the Abbe number $v_{12p}$ of the positive lens in the cemented lens assembly of the second subgroup L12. If the Abbe number of $v_{12p}$ is larger than that of $84_{12n}$, dispersion of the positive lens is smaller than dispersion of negative lens. In general, for the color elimination system in the concave lens group, dispersion of the positive lens is large and the dispersion of the negative lens is small. However, for a zoom lens with strong refractive power of the first lens group G1 and with strong refractive power of the first subgroup L11, which is on the object side in the first lens group G1, the second order dispersion of chromatic aberration of magnification increases and the higher order chromatic aberration of magnification (drastic difference in the amount of occurrence due to field angle difference) occurs easily if a sufficient amount of dispersion difference is to be maintained to execute color elimination with respect to the reference line. In order to satisfactorily correct these problems, reverse dispersion difference is given to the cemented negative lens in the second subgroup L12 to maintain balance between other lenses in the first lens group G1. Since this is equivalent to producing an imaginary Abbe number that does not exist in glass material by cementing, it is advantageous in maintaining favorable balance between correction of the chromatic aberration of magnification at the maximum wide-angle state and the correction of chromatic aberration of magnification at the maximum telephoto state. Hence if $n_{12n}-n_{12p}$ is outside of the range defined by the conditional formula (10), the difference of occurrence amount due to the field angle of chromatic aberration of magnification and the second order dispersion, particularly at the maximum wide-angle state cannot be corrected sufficiently, which is undesirable.

Here, in the case of a complex aspherical lens made of a combination of so-called resin material and glass material, the resin material part cannot be considered as one lens, from a refractive power point of view. In other words, the resin material part cannot stand as an independent lens part, hence the complex aspherical lens cannot be considered as a so-called cemented lens. Therefore, the resin material part should be regarded as a function attached to the glass material part. In other words, conditional formulas (9) and (10) should be applied to independent "lenses" which excludes the resin material part.

In the present invention, the following conditional formulas are preferably satisfied, $$0.05 < n_{22n} - n_{22p} < 0.4 \quad (11)$$

$$0.05 < n_{23n} - n_{23p} < 0.4 \quad (12)$$

where, $n_{22n}$ is the index of refraction of the negative lens in the cemented negative lens assembly in the second subgroup L22 relative to d-line, $n_{22p}$ is the index of refraction of the positive lens in the cemented negative lens assembly in the second subgroup L22 relative to d-line, $n_{23n}$ is the index of refraction of the negative lens in the cemented positive lens assembly in the third subgroup L23 relative to d-line, and $n_{23p}$ is the index of refraction of the positive lens in the cemented positive lens assembly in the third subgroup L23 relative to d-line.

Conditional formula (11) defines a condition on difference between indices of refraction of the cemented negative lens in the second subgroup L22, and conditional formula (12) defines a condition on difference between indices of refraction of the cemented positive lens in the subgroup L23. If $n_{22n}-n_{22p}$ and $n_{23n}-n_{23p}$ are larger than the upper limit values of conditional formula (11) and conditional formula (12) respectively, a material with a small transmission rate for light having short wavelength is to be used as a glass material for the negative lens, causing undesirable worsening of color balance. Even better results may be obtained by changing the upper limits of conditional formulas (11) and (12) to 0.35 and 0.32 respectively.

On the other hand, if $n_{22n}-n_{22p}$ and $n_{23n}-n_{23p}$ are smaller than the lower limit values of conditional formula (6) and conditional formula (7) respectively, the Petzval sum becomes insufficient, making correction of image surface bowing and astigmatism, as well as correction of spherical aberration difficult. In particular, conditional formula (12) causes worsening of upper coma, which is undesirable. Even better correction of each aberration may be achieved by changing both lower limit values of conditional formula (11) and (12) to 0.1.

In the present invention, the following conditional formula is preferably satisfied, $$-1 < \kappa < 1 \quad (13)$$

when the shape of the aspherical surface lens surface provided in one of the lens surfaces of the first subgroup L11 and the second subgroup L12 is expressed by, $$S(y) = \frac{y^2/R}{1 + \sqrt{1 - \kappa y^2/R^2}} + \sum_{i=2}^{N} C_{2i} y^{2i} \quad (N \geq 2)$$

where, y is the height in the direction perpendicular to the optical axis,

S(y) is the displacement amount at height y in the direction of the optical axis, R is the radius of curvature on the optical axis, $\kappa$ is a conical coefficient, and $C_n$'s the aspherical coefficient of order n.

Conditional formula (13) defines a condition on an aspherical surface introduced in the first lens group G1. To change $\kappa$ (conical coefficient) is to use an aspherical surface based on a second degree surface other than a spherical surface (a spherical surface if $\kappa=1$, a parabolic surface if $\kappa=0$, and a hyperbolic surface if $\kappa=-1$. See FIG. 35.) Hence, if $\kappa$ is larger than the upper limit value of conditional formula (13), the surface becomes beyond spherical to an elliptic surface. If $\kappa$ is greater than 1, the aspherical surface with elliptic shape has a shape with mild curvature in the vicinity of the optical axis and suddenly larger curvature towards the perimeter. Hence, in the case when a negative lens, particularly a concave surface of a negative meniscus lens is provided, as in the present invention, the polarization angle of light rays entering or exiting from the vicinity of the aspherical perimeter increases rapidly, reversely causing an increase in bow, which is undesirable.

On the other hand, if $\kappa$ is smaller than the lower limit value of conditional formula (13), refractive power in the vicinity of the perimeter becomes too weak, causing the incident height of the oblique light ray to rise higher, resulting in an undesirably larger diameter of the frontmost lens.

Here, conceptual behavior based on aberration is described when the reference spherical surface is changed to conic surfaces, but by sufficiently utilizing aspherical coefficients $C_n$ other than $\kappa$, apparent value range of $\kappa$ may be widened, in particular, higher order terms should be used to correct aberration to improve correction capability in the vicinity of the perimeter.

The Tables 4–8 below list the dimensions of each embodiment. In the [Total System Dimension] of each Table, f is the focal length of the total system, $F_{NO}$ is the F-number, $2\omega$ is a field angle. In [Lens Dimension], the first column is the lens surface number assigned in the following order from the object side, the second column r is the radius of curvature of each lens surface, the third column d is space between each lens surface, the fourth column $v_d$ is the Abbe number of each lens relative to d-line ($\lambda$=587.6 nm), and the fifth column $n_d$ is the index of refraction of each lens relative to d-line. Moreover, the asterisk in the first column indicates that the lens surface is aspherical. In [Focusing D], $f/\beta$ is either the focal length f or the magnification $\beta$ and $d_0$ is the object distance.

Furthermore, the Table 9 below lists parameter values for each conditional formula (6)–(13) for each embodiment.

TABLE 4

Total System Dimension
f = 1.0~1.74    $F_{NO}$ = 4.08
$2\omega$ = 106.8°~73.7°
Lens Dimension

| No. | r | d | $v_d$ | $n_d$ |
|---|---|---|---|---|
| 1 | 4.8202 | 0.1269 | 40.90 | 1.796310 |
| *2 | 0.9266 | 1.0448 | | |
| 3 | 1363.4381 | 0.1194 | 45.37 | 1.796681 |
| 4 | 1.3637 | 0.3731 | 58.90 | 1.518230 |
| 5 | 2.5259 | 0.0455 | | |
| 6 | 2.0454 | 0.4104 | 25.50 | 1.804581 |
| 7 | −36.5618 | $d_7$ | | |
| 8 | 1.7254 | 0.2090 | 61.09 | 1.589130 |
| 9 | −24.7731 | 0.0075 | | |
| 10 | 2.6185 | 0.1642 | 61.09 | 1.589130 |
| 11 | 9.1768 | 0.1119 | | |
| 12 | — | 0.1119 | (aperture stop) | |
| 13 | 9.2856 | 0.5970 | 64.10 | 1.516800 |
| 14 | −0.8852 | 0.2537 | 40.90 | 1.796310 |
| 15 | 7.3827 | 0.0373 | | |
| 16 | −12.2771 | 0.1306 | 33.89 | 1.803840 |
| 17 | 1.2824 | 0.3731 | 70.41 | 1.487490 |
| 18 | −1.4008 | 0.0075 | | |
| 19 | −14.3429 | 0.1642 | 61.09 | 1.589130 |
| 20 | −1.9553 | $d_{20}$ | | |
| 21 | — | $d_{21}$ | (flare stopper) | |

Aspherical Surface Data

NO = 2    $\kappa$ = 0.1162    $C_4 = 3.77250 \times 10^{-2}$
$C_6 = 8.78030 \times 10^{-4}$
$C_8 = 1.36620 \times 10^{-2}$
$C_{10} = -2.09550 \times 10^{-3}$ Focusing Data

| | Position 1 | Position 2 | Position 3 | Position 4 | Position 5 |
|---|---|---|---|---|---|
| $f/\beta$ | 1.00000 | 1.49254 | 1.73881 | −0.02500 | −0.02500 |
| $d_0$ | ∞ | ∞ | ∞ | 37.9782 | 57.6797 |
| $d_7$ | 1.74515 | 0.44752 | 0.07438 | 1.81738 | 0.49591 |
| $d_{20}$ | −0.01493 | 0.14925 | 0.26119 | −0.01493 | 0.14925 |
| $d_{21}$ | 2.25873 | 2.76492 | 2.98817 | 2.25899 | 2.76518 |

| | Position 6 | Position 7 | Position 8 | Position 9 |
|---|---|---|---|---|
| $f/\beta$ | −0.02500 | −0.12786 | −0.19084 | −0.22233 |
| $d_0$ | 67.5305 | 5.7991 | 5.7991 | 5.7991 |
| $d_7$ | 0.11592 | 2.11455 | 0.81693 | 0.44379 |
| $d_{20}$ | 0.26119 | −0.01493 | 0.14925 | 0.26119 |
| $d_{21}$ | 2.98843 | 2.26583 | 2.78077 | 3.00971 |

TABLE 5

Total System Dimension
f = 1.0~1.74    $F_{NO}$ = 4.09
$2\omega$ = 106.8°~73.7°
Lens Dimension

| No. | r | d | $v_d$ | $n_d$ |
|---|---|---|---|---|
| 1 | 5.6362 | 0.1269 | 40.90 | 1.796310 |
| *2 | 0.9406 | 1.0448 | | |
| 3 | 228.8063 | 0.1194 | 45.37 | 1.796681 |
| 4 | 1.4223 | 0.3507 | 58.90 | 1.518230 |
| 5 | 3.0941 | 0.0086 | | |
| 6 | 2.1203 | 0.3955 | 25.50 | 1.804581 |
| 7 | −28.7191 | $d_7$ | | |
| 8 | 1.6899 | 0.2612 | 58.90 | 1.518230 |
| 9 | −7.1217 | 0.0075 | | |
| 10 | 2.3294 | 0.2239 | 58.90 | 1.518230 |
| 11 | 17.6869 | 0.1119 | | |
| 12 | — | 0.1119 | (aperture stop) | |
| 13 | −4.9166 | 0.5224 | 58.90 | 1.518230 |
| 14 | −0.8785 | 0.2239 | 40.90 | 1.796310 |
| 15 | 13.0412 | 0.0522 | | |
| 16 | −6.8986 | 0.1493 | 33.89 | 1.803840 |
| 17 | 1.4222 | 0.3433 | 70.41 | 1.487490 |
| 18 | −1.4180 | 0.0075 | | |
| 19 | 23.6471 | 0.2090 | 64.10 | 1.516800 |
| 20 | −1.6550 | $d_{20}$ | | |
| 21 | — | $d_{21}$ | (flare stopper) | |

Aspherical Surface Data

NO = 2    $\kappa$ = 0.0898    $C_4 = 2.97490 \times 10^{-2}$
$C_6 = 3.09090 \times 10^{-3}$
$C_8 = 8.49860 \times 10^{-3}$
$C_{10} = -1.51110 \times 10^{-3}$ Focusing Data

| | Position 1 | Position 2 | Position 3 | Position 4 | Position 5 |
|---|---|---|---|---|---|
| $f/\beta$ | 1.00000 | 1.49254 | 1.73881 | −0.02500 | −0.02500 |
| $d_0$ | ∞ | ∞ | ∞ | 37.9140 | 57.6155 |
| $d_7$ | 1.98380 | 0.51143 | 0.08804 | 2.06737 | 0.56742 |
| $d_{20}$ | −0.01492 | 0.33582 | 0.48508 | −0.01492 | 0.33582 |
| $d_{21}$ | 2.40733 | 2.71397 | 2.89341 | 2.40758 | 2.71423 |

| | Position 6 | Position 7 | Position 8 | Position 9 |
|---|---|---|---|---|
| $f/\beta$ | −0.02500 | −0.08148 | −0.12162 | −0.14168 |
| $d_0$ | 67.4663 | 10.1866 | 10.1866 | 10.1866 |
| $d_7$ | 0.13610 | 2.25619 | 0.78382 | 0.36043 |
| $d_{20}$ | 0.48508 | −0.01492 | 0.33582 | 0.48508 |
| $d_{21}$ | 2.89367 | 2.41014 | 2.72025 | 2.90193 |

TABLE 6

Total System Dimension
f = 1.0~1.74    $F_{NO}$ = 4.09
$2\omega$ = 106.8°~73.7°

| No. | r | d | $v_d$ | $n_d$ |
|---|---|---|---|---|
| 1 | 3.6177 | 0.1269 | 46.54 | 1.804109 |
| *2 | 0.9190 | 1.0448 | | |
| 3 | −10.0327 | 0.1194 | 46.54 | 1.804109 |
| 4 | 1.4223 | 0.3358 | 64.10 | 1.516800 |
| 5 | 2.8330 | 0.0758 | | |
| 6 | 2.2351 | 0.3731 | 28.56 | 1.795040 |
| 7 | −12.3733 | $d_7$ | | |
| 8 | 1.6424 | 0.2090 | 61.09 | 1.589130 |
| 9 | −20.0567 | 0.0075 | | |
| 10 | 2.6478 | 0.1642 | 61.09 | 1.589130 |

TABLE 6-continued

Total System Dimension
f = 1.0~1.74   $F_{NO}$ = 4.09
$2\omega$ = 106.8°~73.7°

| No. | r | d | $\nu_d$ | $n_d$ |
|---|---|---|---|---|
| 11 | 7.1155 | 0.1119 | | |
| 12 | — | 0.1119 | (aperture stop) | |
| 13 | 7.7041 | 0.5970 | 64.10 | 1.516800 |
| 14 | −0.8629 | 0.2537 | 40.90 | 1.796310 |
| 15 | 3.5508 | 0.0522 | | |
| 16 | 15.5955 | 0.1306 | 33.89 | 1.803840 |
| 17 | 1.3408 | 0.3731 | 70.41 | 1.487490 |
| 18 | −1.5376 | 0.0075 | | |
| 19 | −45.2286 | 0.2015 | 61.09 | 1.589130 |
| 20 | −2.0269 | $d_{20}$ | | |
| 21 | — | $d_{21}$ | (flare stopper) | |

Aspherical Surface Data

NO = 2   $\kappa$ = 0.1596   $C_4$ = 4.83843 × $10^{-2}$
$C_6$ = 6.62965 × $10^{-3}$
$C_8$ = 1.17219 × $10^{-2}$
$C_{10}$ = 4.02415 × $10^{-3}$ Focusing Data

| | Position 1 | Position 2 | Position 3 | Position 4 | Position 5 |
|---|---|---|---|---|---|
| f/β | 1.00000 | 1.49254 | 1.73881 | −0.02500 | −0.02500 |
| $d_0$ | ∞ | ∞ | ∞ | 37.9975 | 57.6990 |
| $d_7$ | 1.72445 | 0.44256 | 0.07395 | 1.79493 | 0.48979 |
| $d_{20}$ | −0.02293 | 0.29050 | 0.43975 | −0.02293 | 0.29050 |
| $d_{21}$ | 2.21662 | 2.58185 | 2.77185 | 2.21686 | 2.58203 |

| | Position 6 | Position 7 | Position 8 | Position 9 |
|---|---|---|---|---|
| f/β | −0.02500 | −0.11779 | −0.17580 | −0.20481 |
| $d_0$ | 67.5498 | 6.4874 | 6.4874 | 6.4874 |
| $d_7$ | 0.11449 | 2.05653 | 0.77465 | 0.40604 |
| $d_{20}$ | 0.43975 | −0.02293 | 0.29050 | 0.43975 |
| $d_{21}$ | 2.77208 | 2.22210 | 2.59402 | 2.78846 |

TABLE 7

Total System Dimension
f = 1.0~1.74   $F_{NO}$ = 4.2
$2\omega$ = 106.8°~73.7°
Lens Dimension

| No. | r | d | $\nu_d$ | $n_d$ |
|---|---|---|---|---|
| 1 | 3.8029 | 0.1269 | 46.54 | 1.804109 |
| *2 | 0.9036 | 1.0448 | | |
| 3 | −10.4928 | 0.1194 | 46.54 | 1.804109 |
| 4 | 1.4383 | 0.2985 | 64.10 | 1.516800 |
| 5 | 3.1359 | 0.0515 | | |
| 6 | 2.1875 | 0.3881 | 28.56 | 1.795040 |
| 7 | −12.3135 | $d_7$ | | |
| 8 | 2.4020 | 0.2239 | 61.09 | 1.589130 |
| 9 | −18.4623 | 0.0075 | | |
| 10 | 2.1872 | 0.1642 | 58.90 | 1.518230 |
| 11 | 22.0176 | 0.1119 | | |
| 12 | — | 0.1119 | (aperture stop) | |
| 13 | 20.0868 | 0.6875 | 64.10 | 1.516800 |
| 14 | −0.8727 | 0.1791 | 40.90 | 1.796310 |
| 15 | 2.8511 | 0.1045 | | |
| 16 | −3.7285 | 0.1940 | 61.09 | 1.589130 |
| 17 | −1.4506 | 0.0075 | | |
| 18 | 4.6526 | 0.0970 | 33.89 | 1.803840 |

TABLE 7-continued

Total System Dimension
f = 1.0~1.74   $F_{NO}$ = 4.2
$2\omega$ = 106.8°~73.7°
Lens Dimension

| No. | r | d | $\nu_d$ | $n_d$ |
|---|---|---|---|---|
| 19 | 1.5765 | 0.4104 | 70.41 | 1.487490 |
| 20 | −1.4930 | $d_{20}$ | | |
| 21 | — | $d_{21}$ | (flare stopper) | |

Aspherical Surface Data

NO = 2   $\kappa$ = 0.1576   $C_4$ = 4.82660 × $10^{-2}$
$C_6$ = 7.63800 × $10^{-3}$
$C_8$ = 8.99270 × $10^{-3}$
$C_{10}$ = 5.81720 × $10^{-3}$ Focusing Data

| | Position 1 | Position 2 | Position 3 | Position 4 | Position 5 |
|---|---|---|---|---|---|
| f/β | 1.00000 | 1.49254 | 1.73881 | −0.02500 | −0.02500 |
| $d_0$ | ∞ | ∞ | ∞ | 37.9626 | 57.6641 |
| $d_7$ | 1.81521 | 0.46257 | 0.07361 | 1.88887 | 0.51192 |
| $d_{20}$ | −0.00028 | 0.31315 | 0.53703 | −0.00028 | 0.31315 |
| $d_{21}$ | 2.37315 | 2.74499 | 2.86375 | 2.37341 | 2.74525 |

| | Position 6 | Position 7 | Position 8 | Position 9 |
|---|---|---|---|---|
| f/β | −0.02500 | −0.12159 | −0.18147 | −0.21142 |
| $d_0$ | 67.5149 | 6.1871 | 6.1871 | 6.1871 |
| $d_7$ | 0.11597 | 2.17342 | 0.82078 | 0.43182 |
| $d_{20}$ | 0.53703 | −0.00028 | 0.31315 | 0.53703 |
| $d_{21}$ | 2.86401 | 2.37953 | 2.75924 | 2.88311 |

TABLE 8

Total System Dimension
f = 1.0~1.74   $F_{NO}$ = 4.1
$2\omega$ = 106.8°~73.7°
Lens Dimension

| No. | r | d | $\nu_d$ | $n_d$ |
|---|---|---|---|---|
| 1 | 3.8201 | 0.1269 | 46.54 | 1.804109 |
| *2 | 0.9125 | 1.0448 | | |
| 3 | −10.1311 | 0.1194 | 46.54 | 1.804109 |
| 4 | 1.3851 | 0.3358 | 64.10 | 1.516800 |
| 5 | 2.8698 | 0.0666 | | |
| 6 | 2.2030 | 0.3731 | 28.56 | 1.795040 |
| 7 | −11.2006 | $d_7$ | | |
| 8 | 1.6431 | 0.2090 | 61.09 | 1.589130 |
| 9 | −20.2373 | 0.0075 | | |
| 10 | 2.7168 | 0.1642 | 61.09 | 1.589130 |
| 11 | 6.9593 | 0.1119 | | |
| 12 | — | 0.1119 | (aperture stop) | |
| 13 | 6.2858 | 0.5970 | 64.10 | 1.516800 |
| 14 | −0.8644 | 0.2537 | 40.90 | 1.796310 |
| 15 | 3.2636 | 0.0522 | | |
| 16 | 10.1484 | 0.1306 | 33.89 | 1.803840 |
| 17 | 1.3198 | 0.3731 | 70.41 | 1.487490 |
| 18 | −1.4804 | 0.0075 | | |
| 19 | −20.9301 | 0.2015 | 61.09 | 1.589130 |
| 20 | −2.1080 | $d_{20}$ | | |
| 21 | — | $d_{21}$ | (flare stopper) | |

Aspherical Surface Data

| NO = 2 | κ = 0.1510 | $C_4 = 4.49000 \times 10^{-2}$ |
|---|---|---|
| | | $C_6 = 1.26570 \times 10^{-2}$ |
| | | $C_8 = 6.25680 \times 10^{-3}$ |
| | | $C_{10} = 4.19170 \times 10^{-3}$ |

Focusing Data

| | Position 1 | Position 2 | Position 3 | Position 4 | Position 5 |
|---|---|---|---|---|---|
| f/β | 1.00000 | 1.49254 | 1.73881 | −0.02500 | −0.02500 |
| $d_0$ | ∞ | ∞ | ∞ | 37.9975 | 57.6990 |
| $d_7$ | 1.72395 | 0.44207 | 0.07346 | 1.79444 | 0.48929 |
| $d_{20}$ | −0.02907 | 0.28436 | 0.43362 | −0.02907 | 0.28436 |
| $d_{21}$ | 2.21662 | 2.58179 | 2.77183 | 2.21687 | 2.58204 |

| | Position 6 | Position 7 | Position 8 | Position 9 |
|---|---|---|---|---|
| f/β | −0.02500 | −0.11779 | −0.17580 | −0.20481 |
| $d_0$ | 67.5498 | 6.4874 | 6.4874 | 6.4874 |
| $d_7$ | 0.11400 | 2.05604 | 0.77416 | 0.40555 |
| $d_{20}$ | 0.43362 | −0.02907 | 0.28436 | 0.43362 |
| $d_{21}$ | 2.77208 | 2.22242 | 2.59475 | 2.78944 |

TABLE 9

| | Embodiment No. | | | | |
|---|---|---|---|---|---|
| | 1 | 2 | 3 | 4 | 5 |
| (1) $|f_1|/f_w$ | 1.70 | 1.828 | 1.679 | 1.716 | 1.679 |
| (2) $f_2/f_w$ | 2.313 | 2.44 | 2.313 | 2.388 | 2.313 |
| (3) $|f_{11}|/f_w$ | 1.46 | 1.435 | 1.565 | 1.503 | 1.520 |
| (4) $n_{12n} - n_{12p}$ | 0.2785 | 0.2785 | 0.2873 | 0.2873 | 0.2873 |
| (5) $v_{12n} < v_{12p}$ | ○ | ○ | ○ | ○ | ○ |
| (6) $n_{22n} - n_{22o}$ | 0.2795 | 0.2781 | 0.2795 | 0.2795 | 0.2795 |
| (7) $n_{23n} - n_{23p}$ | 0.3164 | .3164 | 0.3164 | 0.3164 | 0.3164 |
| (8) x | 0.1162 | 0.8998 | 0.1596 | 0.1579 | 0.1510 |

FIGS. 16A–I, FIGS. 17A–I and FIGS. 18A–I describe spherical aberration, astigmatism, distortion, coma and chromatic aberration of magnification at the maximum wide-angle state, at an intermediate distance and at the maximum telephoto state during infinite focus state of the first embodiment. Likewise, FIGS. 20A–22I, FIGS. 24A–26I, FIGS. 28A–30I, and FIGS. 32A–34I describe various aberration of the third through seventh embodiment. In the spherical aberration diagram, the dotted line describes the sine condition. In the astigmatism diagram, the real line describes the sagittal image surface and the dotted line describes the meridional image surface. In each figure, $F_{NO}$ is F-number and 2ω is a half field angle.

Figure 35:
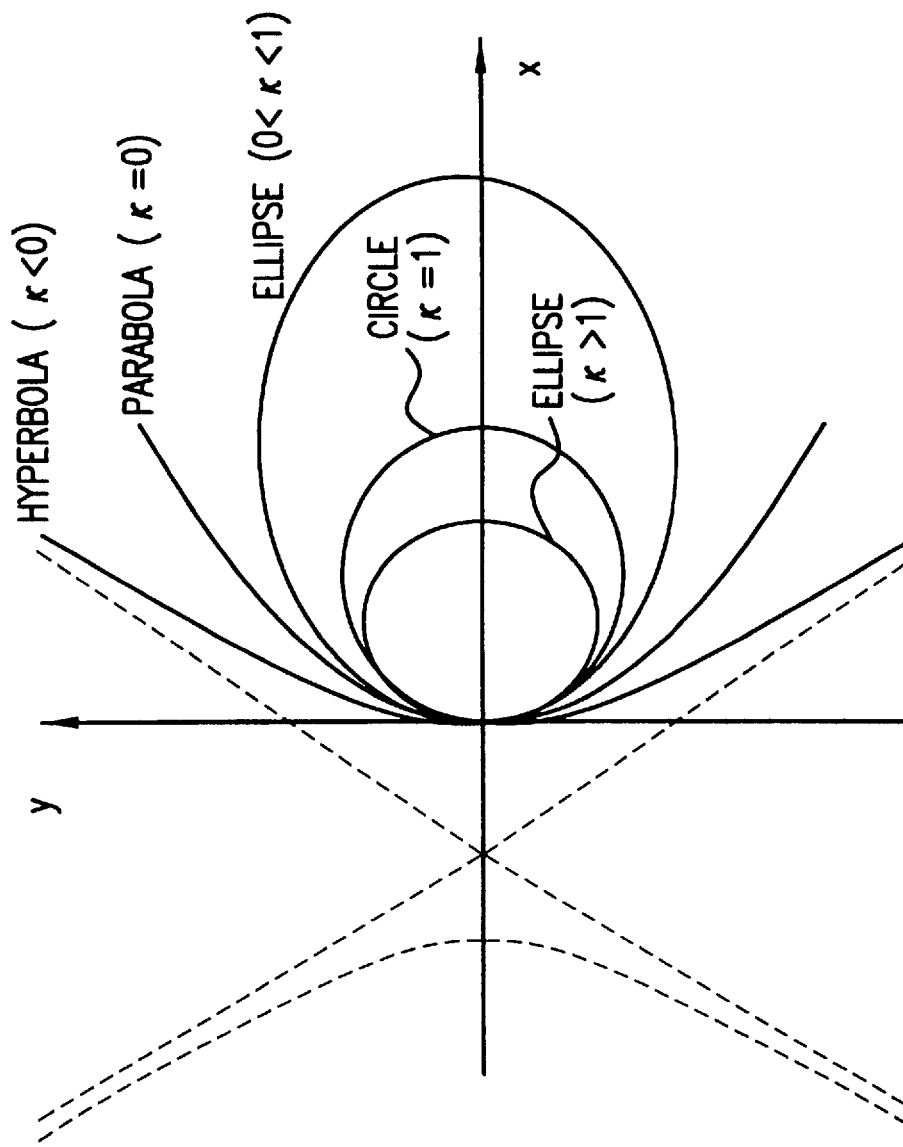
FIG. 35 is a diagram describing an aspherical surface shape caused by different aspherical surface coefficients with the same curvature on the optical axis.

From each aberration diagram it is clear that use of an appropriate lens configuration, satisfaction of conditional formulas (6)–(8), and satisfaction of conditional formulas (9)–(13) result in excellent imaging performance in each embodiment. FIG. 35 shows an aspherical surface shape caused by different coefficients with the same curvature.

The invention has been described with reference to preferred embodiments thereof, which are illustrative and not limiting. Various changes can be made without departing from the spirit and scope of the invention as defined in the appended claims.

What is claimed is:

1. A zoom lens comprising, in the following order from an object side toward an image side:

a first lens group G1 with a negative refractive power; and
a second lens group G2 with a positive refractive power, wherein zooming is executed by changing the dead space between lens groups G1 and G2, further wherein the first lens group G1 comprises, in the following order from the object side, a first lens group front group $G_{1F}$ with a negative refractive power, and a first lens group rear group $G_{1R}$ with either a negative refractive power or a positive refractive power having at least one set of negative lens components $L_n$ and positive lens components $L_p$ having the function of chromatic aberration correction, further wherein focusing is executed by moving only the first lens group front group $G_{1F}$.

2. The zoom lens of claim 1, wherein the following conditional formula is satisfied, $$0.3 \leq f_{1F}/f_1 \leq 1 \tag{1}$$

where $f_1$ is the focal length of the first lens group G1 at a maximum wide-angle state during an infinite focus state and $f_{1F}$ is the focal length of the first lens group front group $G_{1F}$.

3. The zoom lens of claim 2, wherein the following conditional formula is satisfied, $$5.0 < v_n - v_p \tag{2}$$

where vn is the Abbe number of the negative lens component $L_n$ in the first lens group rear group $G_{1R}$ and $v_p$ is the Abbe number of the positive lens component $L_p$ in the first lens group rear group $G_{1R}$.

4. The zoom lens of claim 3, wherein at least one lens surface out of all lenses in the first lens group front group $G_{1F}$ is formed in an aspherical shape, and the negative lens components $L_n$ of the first lens group rear group $G_{1R}$ is placed closer to the object side than the positive lens components $L_p$ of the first lens group rear group $G_{1R}$.

5. The zoom lens of claim 1, wherein at least one lens surface out of all lenses in the first lens group front group $G_{1F}$ is formed in an aspherical shape, and the negative lens components $L_n$ of the first lens group rear group $G_{1R}$ is placed closer to the object side than the positive lens components $L_p$ of the first lens group rear group $G_{1R}$.

6. The zoom lens of claim 3, wherein the following conditional formula is satisfied, $$1 \leq |f_1|/f_w \leq 2.5 \tag{3}$$

where $f_1$ is a focal length of the first lens group G1 at the maximum wide-angle state during an infinite focus state, and $f_w$ is the focal length of the total zoom lens at the maximum wide-angle state.

7. The zoom lens of claim 1, wherein the following conditional formula is satisfied, $$1 \leq |f_1|/f_w \leq 2.5 \tag{3}$$

where $f_1$ is a focal length of the first lens group G1 at a maximum wide-angle state during an infinite focus state, and $f_w$ is the focal length of the total zoom lens at the maximum wide-angle state.

8. The zoom lens of claim 6, wherein the second lens group G2 comprises, in the following order from the object side, a positive lens component, a negative lens component and a positive lens component and satisfies conditional formula, $$1.6 < f_2/f_w < 3.0 \tag{4}$$

where $f_2$ is the focal length of the second lens group G2 and $f_w$ is the focal length of the total zoom lens at the maximum wide-angle state.

9. The zoom lens of claim 1, wherein the second lens group G2 comprises, in the following order from the object side, a positive lens component, a negative lens component and a positive lens component and satisfies conditional formula, $$1.6 < f_2/f_w < 3.0 \qquad (4)$$

where $f_2$ is the focal length of the second lens group G2 and $f_w$ is the focal length of the total zoom lens at a maximum wide-angle state.

10. The zoom lens of claim 9, wherein the following conditional formula is satisfied, $$2 < BF_w/f_w \qquad (5)$$

where $BF_w$ is a back focus at the maximum wide-angle state and $f_w$ is the focal length of the total zoom lens at the maximum wide-angle state.

11. The zoom lens of claim 2, wherein the following conditional formula is satisfied, $$2 < BF_w/f_w \qquad (5)$$

where $BF_w$ is a back focus at the maximum wide-angle state and $f_w$ is the focal length of the total zoom lens at the maximum wide-angle state.

12. The zoom lens of claim 1, wherein the following conditional formula is satisfied, $$2 < BF_w/f_w \qquad (5)$$

where $BF_w$ is a back focus at a maximum wide-angle state and $f_w$ is the focal length of the total zoom lens at the maximum wide-angle state.

13. The zoom lens of claim 10, wherein the first lens group front group $G_{1F}$ comprises one aspherical surface lens having a negative refractive power.

14. The zoom lens of claim 1, wherein the first lens group front group $G_{1F}$ comprises one aspherical surface lens having a negative refractive power.

15. A zoom lens comprising, in the following order from an object side toward an image side:

a first lens group G1 with a negative refractive power; and
a second lens group G2 with a positive refractive power, wherein zooming is executed by changing dead space between lens group G1 and lens group G2,
further wherein the first lens group G1 comprises in the following order from the object side, a first subgroup L11 having a negative refractive power formed in a meniscus shape with a concave surface facing the image side, a second subgroup L12 with a negative refractive power having a cemented negative lens assembly with at least a negative lens and a positive lens cemented, and a third subgroup L13 having a positive refractive power with a convex side facing the object side,
further wherein the second lens group G2 comprises, in the following order from the object side, a first subgroup L21 having a positive refractive power with at least one convex lens, a second subgroup L22 with a negative refractive power having a cemented negative lens assembly with at least a positive lens and a negative lens cemented, and a third subgroup L23 with a positive refractive power having a cemented positive lens assembly with at least a negative lens and a positive lens cemented,
further wherein at least one lens surface among all lens surfaces of the first subgroup L11 and the second subgroup L12 is formed in an aspherical shape and the following conditional formulas are satisfied, $$0.5 < |f11|/fw < 4 \qquad (8)$$

where, fw is the focal length of the total zoom lens at a maximum wide-angle state, and
f11 is the focal length of the first subgroup L11, and $$v_{12n} < v_{12p} \qquad (10)$$

where, $v_{12n}$ is the Abbe number of the negative lens in the cemented negative lens assembly in the second subgroup L12, and
$v_{12p}$ is the Abbe number of the positive lens in the cemented negative lens assembly in the second subgroup L12.

16. The zoom lens of claim 15, where in the following conditional formula is satisfied, $$1.0 < |f1|/fw < 2.0 \qquad (6)$$

where, f1 is the focal length of the first lens group G1.

17. The zoom lens of claim 16, wherein the following conditional formula is satisfied, $$1.5 < f2/fw < 3.5 \qquad (7)$$

where, f2 is the focal length of the second lens group G2.

18. The zoom lens of claim 15, wherein the following conditional formula is satisfied, $$1.5 < f2/fw < 3.5 \qquad (7)$$

where, f2 is the focal length of the second lens group G2.

19. The zoom lens of claim 15, wherein the following conditional formula is satisfied, $$0.05 < n_{12n} - n_{12p} < 0.4 \qquad (9)$$

where, $n_{12n}$ is the index of refraction of the negative lens in the cemented negative lens assembly in the first subgroup L12 relative to d-line, and
$n_{12p}$ is the index of refraction of the positive lens in the cemented negative lens assembly in the second subgroup L12 relative to d-line.

20. The zoom lens of claim 16, wherein the following conditional formula is satisfied, $$0.05 < n_{12n} - n_{12p} < 0.4 \qquad (9)$$

where, $n_{12n}$ is the index of refraction of the negative lens in the cemented negative lens assembly in the first subgroup L12 relative to d-line, and
$n_{12p}$ is the index of refraction of the positive lens in the cemented negative lens assembly in the second subgroup L12 relative to d-line.

21. The zoom lens of claim 15, wherein the following conditional formula is satisfied, $$0.05 < n_{22n} - n_{22p} < 0.4 \qquad (11)$$

where, $n_{22n}$ is the index of refraction of the negative lens in the cemented positive lens assembly in the second subgroup L22 relative to d-line, and
$n_{22p}$ is the index of refraction of the positive lens in the cemented positive lens assembly in the second subgroup L22 relative to d-line.

22. The zoom lens of claim 15, wherein the following conditional formula is satisfied, $$0.05 < n_{23n} - n_{23p} < 0.4 \quad (12)$$

where, $n_{23n}$ is the index of refraction of the negative lens in the cemented positive lens assembly in the second subgroup L23 relative to d-line, and $n_{23p}$ is the index of refraction of the positive lens in the cemented positive lens assembly in the second subgroup L23 relative to d-line.

23. The zoom lens of claim 19, wherein the following conditional formula is satisfied, $$0.05 < n_{22n} - n_{22p} < 0.4 \quad (11)$$

where, $n_{22n}$ is the index of refraction of the negative lens in the cemented negative lens assembly in the second subgroup L22 relative to d-line, and $n_{22p}$ is the index of refraction of the positive lens in the cemented negative lens assembly in the second subgroup L22 relative to d-line.

24. The zoom lens of claim 19, wherein the following conditional formula is satisfied, $$0.05 < n_{23n} - n_{23p} < 0.4 \quad (12)$$

where, $n_{23n}$ is the index of refraction of the negative lens in the cemented positive lens assembly in the second subgroup L23 relative to d-line, and $n_{23p}$ is the index of refraction of the positive lens in the cemented positive lens assembly in the second subgroup L23 relative to d-line.

25. The zoom lens of claim 21, wherein the following conditional formula, $$-1 < \kappa < 1 \quad (8)$$

is satisfied when the shape of the aspherical surface lens surface provided in one of lens surfaces of the first subgroup L11 and the second subgroup L12 is expressed by, $$S(y) = \frac{y^2/R}{1 + \sqrt{1 - \kappa y^2/R^2}} + \sum_{i=2}^{N} C_{2i} y^{2i} \quad (N \geq 2)$$

where, y is the height in the direction perpendicular to the optical axis,

S(y) is the displacement amount at height y in the direction of the optical axis, R is the radius of curvature on the optical axis, $\kappa$ is a conical coefficient, and $C_n$ is the aspherical coefficient of order n.

26. The zoom lens of claim 15, wherein the following conditional formula, $$-1 < \kappa < 1 \quad (8)$$

is satisfied when the shape of the aspherical surface lens surface provided in one of lens surfaces of the first subgroup L11 and the second subgroup L12 is expressed by, $$S(y) = \frac{y^2/R}{1 + \sqrt{1 - \kappa y^2/R^2}} + \sum_{i=2}^{N} C_{2i} y^{2i} \quad (N \geq 2)$$

where, y is the height in the direction perpendicular to the optical axis,

S(y) is the displacement amount at height y in the direction of the optical axis, R is the radius of curvature on the optical axis, $\kappa$ is a conical coefficient, and $C_n$ is the aspherical coefficient of order n.

* * * * *